US012699400B2

(12) United States Patent
Kudo

(10) Patent No.: US 12,699,400 B2
(45) Date of Patent: Aug. 4, 2026

(54) INFORMATION PROCESSING APPARATUS, INFORMATION PROCESSING METHOD, AND PROGRAM FOR PERFORMING ROUTE PLANNING TO SATISFY A CONTRAINT BASED ON A TASK COMPLEXITY TOLERANCE MAP

(71) Applicant: Sony Group Corporation, Tokyo (JP)

(72) Inventor: Yusuke Kudo, Tokyo (JP)

(73) Assignee: Sony Group Corporation, Tokyo (JP)

( * ) Notice: Subject to any disclaimer, the term of this patent is extended or adjusted under 35 U.S.C. 154(b) by 46 days.

(21) Appl. No.: 18/729,895

(22) PCT Filed: Jan. 17, 2023

(86) PCT No.: PCT/JP2023/001237
§ 371 (c)(1),
(2) Date: Jul. 18, 2024

(87) PCT Pub. No.: WO2023/145547
PCT Pub. Date: Aug. 3, 2023

(65) Prior Publication Data
US 2025/0103053 A1      Mar. 27, 2025

(30) Foreign Application Priority Data
Jan. 27, 2022    (JP) ................................. 2022-010944

(51) Int. Cl.
*G05D 1/246*      (2024.01)
*G05D 1/693*      (2024.01)
*G05D 109/10*     (2024.01)

(52) U.S. Cl.
CPC ........... *G05D 1/2469* (2024.01); *G05D 1/693* (2024.01); *G05D 2109/10* (2024.01)

(58) Field of Classification Search
CPC ...... G05D 1/2469; G05D 1/246; G05D 1/693; G05D 1/69; G05D 1/698; G05D 1/6987;
(Continued)

(56) References Cited

U.S. PATENT DOCUMENTS 10,816,973 B2 * 10/2020 Jiang ................... B60W 60/001
11,300,968 B2 * 4/2022 Pierson ................. G08G 1/166
(Continued)

FOREIGN PATENT DOCUMENTS

DE        102012205578 A1 * 10/2013    ......... G01C 21/3629
JP        2008-090576 A      4/2008
(Continued)

OTHER PUBLICATIONS

International Search Report and Written Opinion mailed on Feb. 28, 2023, received for PCT Application PCT/JP2023/001237, filed on Jan. 17, 2023, 11 pages including English Translation.

*Primary Examiner* — Erin M Piateski
*Assistant Examiner* — Ashley Tiffany Schoech
(74) *Attorney, Agent, or Firm* — XSENSUS LLP

(57)        ABSTRACT
An information processing apparatus includes a map generation unit and a route planning unit. The map generation unit calculates allowable complexity of a task as task complexity tolerance and generates a task complexity tolerance map indicating a distribution of the task complexity tolerance. The route planning unit performs route planning for a mobile body (MB) to satisfy constraints based on the task complexity tolerance map.

20 Claims, 20 Drawing Sheets

(58) Field of Classification Search
CPC ........... G05D 2109/00; G05D 2109/10; G05D
2109/12; G05D 2109/13; G05D
2109/135; G05D 2109/14; G05D
2109/15; G05D 2109/16; G05D 2109/18;
G05D 2109/20; G05D 2109/22; G05D
2109/23; G05D 2109/24; G05D 2109/25;
G05D 2109/254; G05D 2109/26; G05D
2109/265; G05D 2109/27; G05D
2109/28; G05D 2109/285; G05D
2109/29; G05D 2109/30; G05D 2109/34;
G05D 2109/36; G05D 2109/38; G05D
2109/40; G05D 2109/50; G05D 2105/00;
G05D 2105/05; G05D 2105/10; G05D
2105/12; G05D 2105/14; G05D 2105/15;
G05D 2105/17; G05D 2105/20; G05D
2105/22; G05D 2105/24; G05D 2105/28;
G05D 2105/285; G05D 2105/29; G05D
2105/30; G05D 2105/31; G05D
2105/315; G05D 2105/32; G05D
2105/34; G05D 2105/345; G05D
2105/35; G05D 2105/40; G05D 2105/45;
G05D 2105/47; G05D 2105/50; G05D
2105/55; G05D 2105/57; G05D 2105/60;
G05D 2105/65; G05D 2105/70; G05D
2105/80; G05D 2105/85; G05D 2105/87;
G05D 2105/89; G05D 2105/93; G05D
2107/00; G05D 2107/10; G05D 2107/13;
G05D 2107/17; G05D 2107/20; G05D
2107/21; G05D 2107/22; G05D 2107/23;
G05D 2107/24; G05D 2107/25; G05D
2107/27; G05D 2107/28; G05D 2107/29;
G05D 2107/30; G05D 2107/34; G05D
2107/36; G05D 2107/38; G05D 2107/40;
G05D 2107/50; G05D 2107/60; G05D
2107/63; G05D 2107/65; G05D 2107/67;
G05D 2107/68; G05D 2107/70; G05D
2107/73; G05D 2107/75; G05D 2107/80;
G05D 2107/84; G05D 2107/85; G05D
2107/87; G01C 21/206; G01C 21/38;
G01C 21/3804; G01C 21/3807; G01C
21/383
See application file for complete search history.

(56) References Cited

U.S. PATENT DOCUMENTS

| | | | | |
|---|---|---|---|---|
| 11,976,934 | B2 * | 5/2024 | Lee ..................... | G01C 21/3676 |
| 2012/0197839 | A1 * | 8/2012 | Vervaet ................ | G09B 29/003 |
| | | | | 707/E17.005 |
| 2014/0032035 | A1 * | 1/2014 | Thomson ............. | G01C 21/206 |
| | | | | 701/25 |
| 2019/0174149 | A1 | 6/2019 | Zhang | |
| 2021/0003418 | A1 * | 1/2021 | Hatayama .................. | B25J 5/00 |
| 2021/0149403 | A1 * | 5/2021 | Ready-Campbell ......................... | |
| | | | | G05D 1/0027 |

FOREIGN PATENT DOCUMENTS

| | | | | |
|---|---|---|---|---|
| JP | 4568892 | B2 | | 10/2010 |
| JP | 4658892 | B2 | | 3/2011 |
| JP | 6598107 | B2 | * | 10/2019 |
| JP | 2019192030 | A | * | 10/2019 |
| JP | 7047980 | B1 | | 4/2022 |
| WO | 2015/037084 | A1 | | 3/2015 |

* cited by examiner

Figure 4:
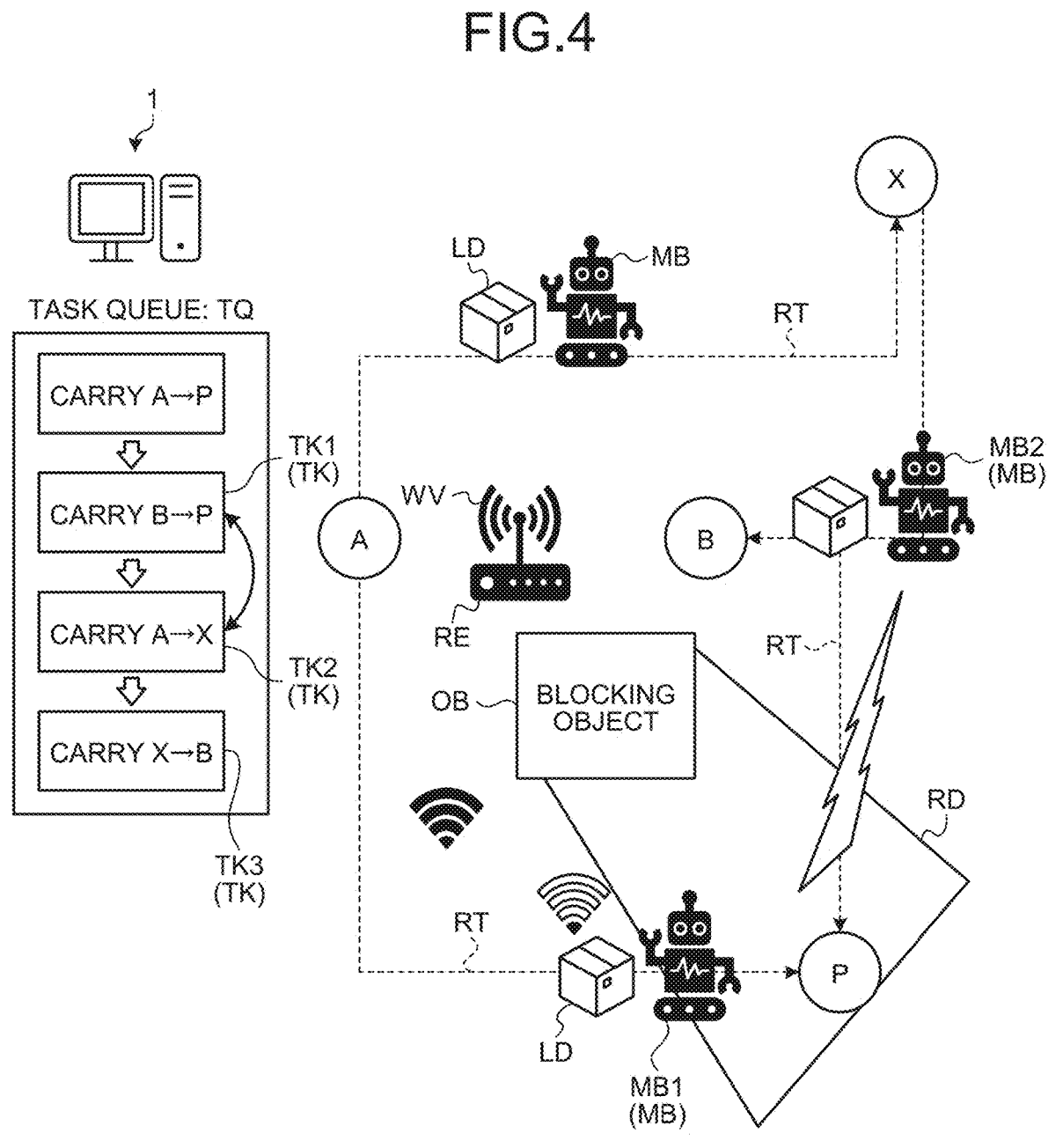

TASK QUEUE: TQ

CARRY A→P

TK1
(TK)

CARRY B→P

CARRY A→X

TK2
(TK)

CARRY X→B

TK3
(TK)

LD

MB

RT

X

WV

A

RE

B

MB2
(MB)

OB

BLOCKING
OBJECT

RT

RD

RT

LD

P

MB1
(MB)

EXAMPLE OF ROUTE PLANNING

ROBOT 1
A→B(0, 3)
B→C(3, 6)
C→D(6, 10)

ROBOT 2
D(0, 3)
D→B(3, 5)
B→E(5, 8)

EDGE PASSAGE: [START NODE]→[GOAL NODE]
([DEPARTURE TIME], [ARRIVAL TIME])

or

WAITING AT NODE: [WAITING NODE]
([START TIME, END TIME])

IS REPRESENTED BY CONTINUITY OF
*IN ORDER TO WAIT FOR OTHER ROBOT,
ROBOT SOMETIMES WAITS IN NODE WITHOUT MOVING.

EXAMPLE OF ROUTE PLANNING

ROBOT 1
A→B(0, 3)
B→C(3, 6)
C→D(6, 10)

ROBOT 2
D(0, 3)
D→B(3, 5)
B→C(5, 8)

CONFLICT AT
TIME (5, 6) AT
EDGE B→C

FIG.10

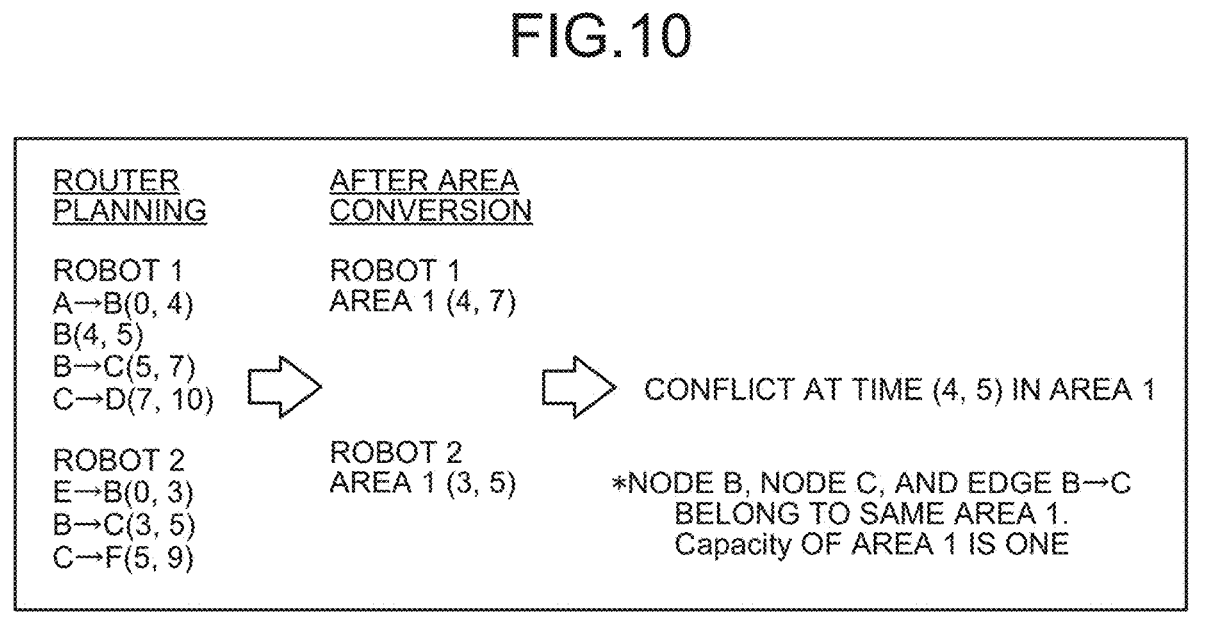

ROUTER
PLANNING

AFTER AREA
CONVERSION

ROBOT 1
A→B(0, 4)
B(4, 5)
B→C(5, 7)
C→D(7, 10)

ROBOT 1
AREA 1 (4, 7)

⇨       ⇨   CONFLICT AT TIME (4, 5) IN AREA 1

ROBOT 2
E→B(0, 3)
B→C(3, 5)
C→F(5, 9)

ROBOT 2
AREA 1 (3, 5)

*NODE B, NODE C, AND EDGE B→C
BELONG TO SAME AREA 1.
Capacity OF AREA 1 IS ONE

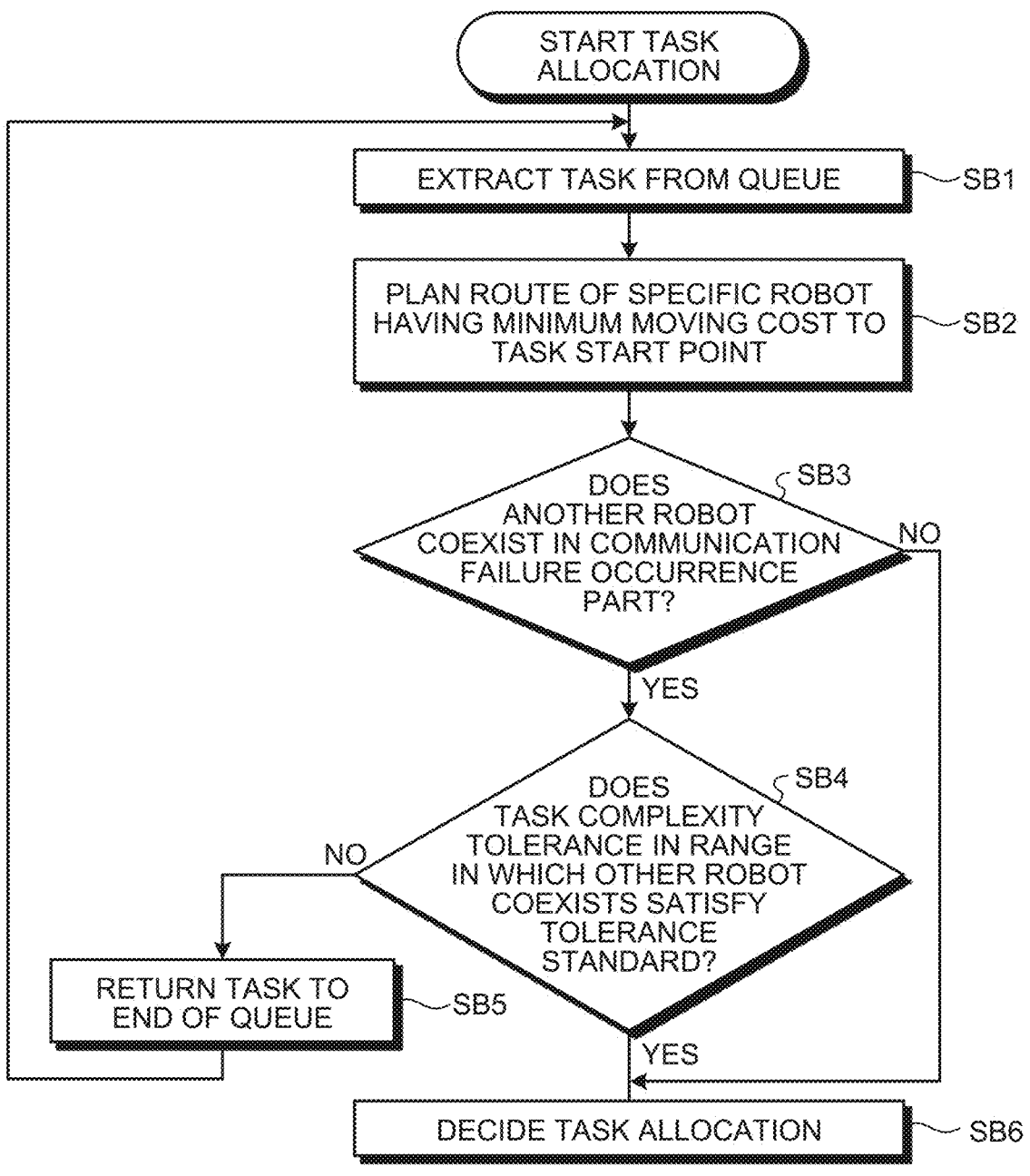

START TASK ALLOCATION

EXTRACT TASK FROM QUEUE — SB1

PLAN ROUTE OF SPECIFIC ROBOT HAVING MINIMUM MOVING COST TO TASK START POINT — SB2

DOES ANOTHER ROBOT COEXIST IN COMMUNICATION FAILURE OCCURRENCE PART? — SB3
NO
YES

DOES TASK COMPLEXITY TOLERANCE IN RANGE IN WHICH OTHER ROBOT COEXISTS SATISFY TOLERANCE STANDARD? — SB4
NO
YES

RETURN TASK TO END OF QUEUE — SB5

DECIDE TASK ALLOCATION — SB6

INFORMATION PROCESSING APPARATUS, INFORMATION PROCESSING METHOD, AND PROGRAM FOR PERFORMING ROUTE PLANNING TO SATISFY A CONTRAINT BASED ON A TASK COMPLEXITY TOLERANCE MAP

CROSS-REFERENCE TO RELATED APPLICATIONS

The present application is based on PCT filing PCT/JP2023/001237, filed Jan. 17, 2023, which claims priority from Japanese Patent Application No. 2022-010944, filed Jan. 27, 2022, the entire contents of each are incorporated herein by reference.

FIELD

The present invention relates to an information processing apparatus, an information processing method, and a program.

BACKGROUND

One of important functions of an autonomous mobile body is route planning. The route planning is to calculate, using a map of a peripheral environment, a route along which a mobile body should move to a goal point.

CITATION LIST

Patent Literature

Patent Literature 1: Japanese Patent No. 4658892
Patent Literature 2: Japanese Patent No. 6598107

SUMMARY

Technical Problem

In a place where a motion of a mobile body becomes unstable because of the influence of a communication environment or the like, contact or the like between mobile bodies occurs and it is difficult to efficiently and safely perform a task. For that reason, a method of limiting a moving range based on a communication environment (Patent Literature 1) and a method of sending a specific mobile body as a radio wave relay base (Patent Literature 2) have been proposed. However, in these methods, there arises a new problem in that a task cannot be executed in a place where a communication environment is unstable or a mobile body having a relay function cannot be caused to perform a significant task.

Therefore, the present disclosure proposes an information processing apparatus, an information processing method, and a program capable of efficiently and safely executing a task even in a place where a motion of a mobile body becomes unstable.

Solution to Problem

According to the present disclosure, an information processing apparatus is provided that comprises: a map generation unit that calculates allowable complexity of a task as task complexity tolerance and generates a task complexity tolerance map indicating a distribution of the task complexity tolerance; and a route planning unit that performs route planning for a mobile body to satisfy a constraint based on the task complexity tolerance map. According to the present disclosure, an information processing method in which an information process of the information processing apparatus is executed by a computer, and a program for causing the computer to execute the information process of the information processing apparatus, are provided.

BRIEF DESCRIPTION OF DRAWINGS

FIG. 4 is a diagram for explaining an overview of route planning of the present disclosure.

FIG. 10 is a diagram for explaining a route planning method considering an area.

FIG. 14 is a diagram for explaining a first form of route planning.

FIG. 18 is a diagram for explaining a second form of the route planning.

FIG. 19 is a diagram for explaining the second form of the route planning.

DESCRIPTION OF EMBODIMENTS

Figure 1:
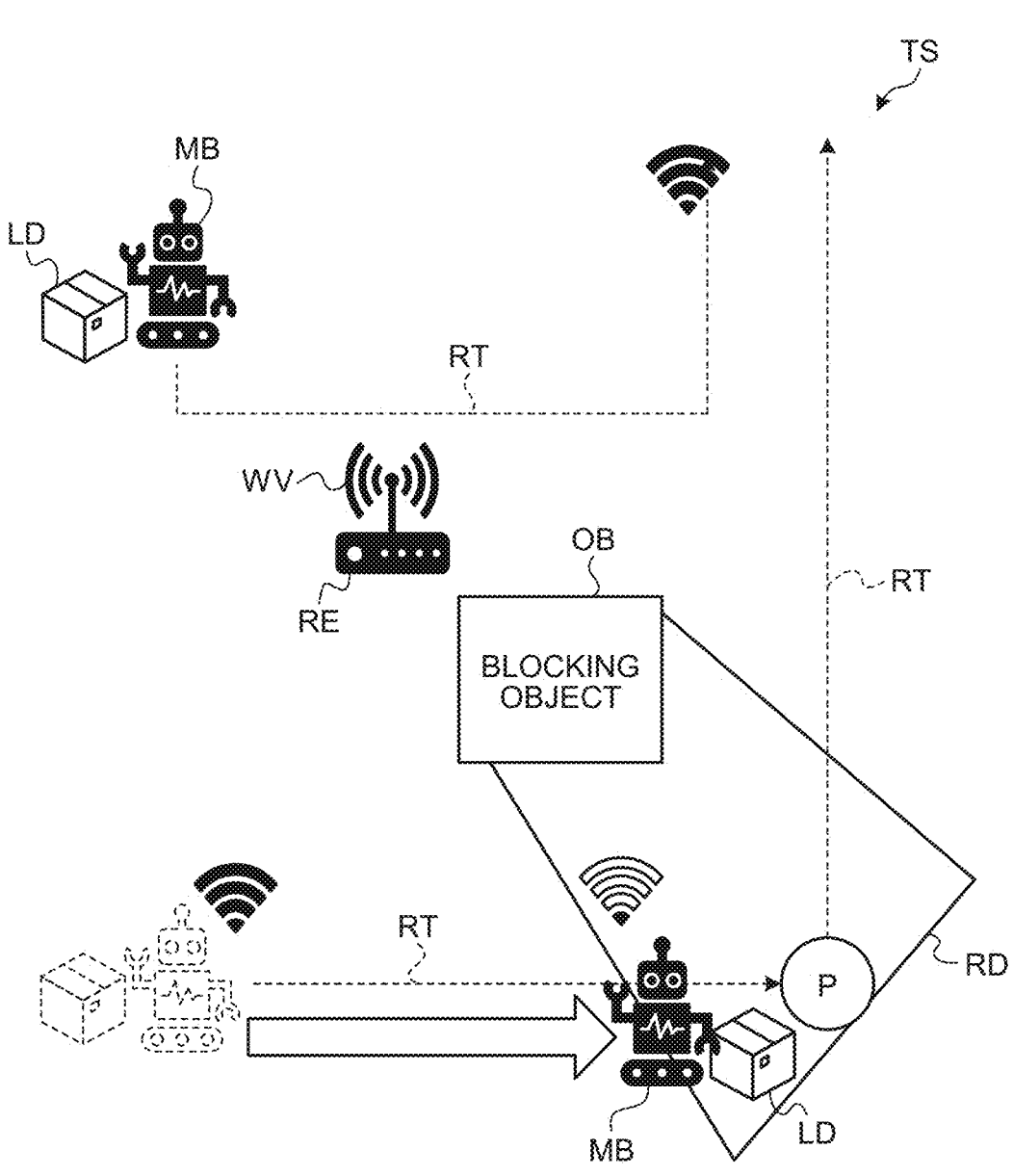
FIG. 1 is a schematic diagram of a mobile body system set as a route search target.

Embodiments of the present disclosure are explained in detail below with reference to the drawings. In the embodiments explained below, redundant explanation is omitted by adding the same reference numerals and signs to the same parts.

Note that the explanation is made in the following order.

[1. Background]
    [1-1. Related Art]
    [1-2. Method of the present disclosure]
[2. Conveyance system of the present disclosure]
    [2-1. Configuration of a conveyance system]
    [2-2. Graph Structure]
    [2-3. Route search method considering an area]
    [2-4. Communication state map]
    [2-5. Task complexity tolerance map]
[3. First form of route planning]
[4. Second form of route planning]
[5. Application example of a route search method of present disclosure]
[6. Hardware configuration example]
[7. Effects]

[1. Background]
[1-1. Related Art]

FIG. 1 is a schematic diagram of a mobile body system as a route search target. In the following explanation, an example is explained in which a mobile body is an autonomous mobile robot MB, and the mobile body system is a conveyance system TS for a conveyance object LD. In all the drawings referred to below, the same reference numerals and signs are added to the same components. When the components of the same types are distinguished from one another, numbers or symbols are added after reference signs.

Systems using a robot MB capable of autonomously traveling are used for various purposes, for example, conveyance of articles, inspection of facilities, security, and the like. In order for the robot MB to move, the robot MB needs to reach a destination not to collide with static and dynamic obstacles OB (including other robots MB) on environment. As a method for the robot MB to move, roughly speaking, there are a method not using a route map and a method using a route map.

The method not using a route map is a method of using a track search algorithm that directly determines a track to a destination. For example, an A* algorithm and an RRT (Rapidly exploring Random Tree) algorithm are known as the track search algorithm. In these methods, recognition of a peripheral map (a peripheral movable region) of the robot MB and a track search for a destination based on the recognition (determination of optimum moving speed and optimum angular velocity at that time) are repeated at a high frequency. This makes it possible to avoid collision even if there is a dynamic obstacle OB.

In the method not using the route map, when environment is wide (a moving distance is large and a destination is far), a search space for determining optimum moving speed and optimum angular velocity is wide. Therefore, there is a problem in that a calculation amount is large and repetition at a high frequency is impossible. This method of determining a track to a destination while repeating peripheral environment recognition and a track search to avoid the obstacle OB is referred to as track planning.

There is a method of using a route map (a graph MP: see FIG. 6) for the purpose of operating the robot MB in wider environment. The route map is expressed as a topological map including a relay node group serving as an intermediate destination candidate and an edge group connecting relay nodes that can directly pass through. In the method using the route map, route planning for determining which nodes ND (see FIG. 6) and edges ED (see FIG. 6) are to be passed between a current location and a final destination is performed first and a moving method among the nodes ND is controlled based on the track planning explained above.

Accordingly, the calculation amount is reduced compared with when all the routes RT to the destination are determined based on the track planning.

A Dijkstra algorithm or the like is often used as a route planning method. A route map is manually designed based on a floor map. The floor map is provided, for example, as a metric map in which the sizes and the positions of objects in a facility are accurately specified based on measurement data. The floor map may be acquired from a database of the facility or may be automatically generated using SLAM (Simultaneous Localization and Mapping) or the like. In the latter form, a peripheral map generated by moving the robot MB in the facility can be used as the floor map.

Collision avoidance by the track planning requires a sufficient space to make it possible to avoid collision. For example, when another robot MB approaches the robot MB on a narrow road or when another robot MB enters an intersection simultaneously from right beside at an orthogonal narrow intersection, it is not possible to calculate a track that can reach a destination (the next routing node ND in the case of using the route map) in the peripheral map that can be recognized by the robot MB. As a result, the two robots MB cannot move while facing each other. This situation is called deadlock.

In the method using the route map, there is known a method of solving a situation by making a route where a deadlock has occurred inaccessible and redoing route planning (reroute planning). In the route planning, since a wider area can be treated than the peripheral map that can be recognized by the robot MB, a simple deadlock can be solved by the reroute planning. However, when the number of robots MB is large, a case that cannot be solved by the viewpoint of the robot Mb alone, for example, a case in which the robot MB cannot return because a subsequent robot MB is also present while the robot MB facing another robots MB on one road easily occurs.

Therefore, a method has been proposed in which the robots MB do not perform the route planning but a central server performs overall optimization by performing route planning for the robots MB. For example, it is conceivable that another robot MB is caused to temporarily wait outside an intersection such that only one robot MB enters the intersection at the same time or a passing direction of one road is determined by time and the robot MB in the opposite direction is caused to temporarily wait before entering the one road. By controlling which robot MB is caused to wait and where and when and which robot MB is caused to pass through which route RT, it is possible to prevent a deadlock from occurring.

The method explained above is effective when control by the server is sufficiently performed. However, since various obstacles OB are present in a work environment of the robot MB, a motion of the robot MB is sometimes unstable depending on a place. For example, in the example illustrated in FIG. 1, the shade of the obstacle OB is an unstable place of a communication state (a communication failure occurrence part RD). A radio wave WN from a repeater RE does not sufficiently reach the communication failure occurrence part RD. Therefore, the robot MB that has entered the communication failure occurrence part RD cannot be sufficiently controlled by the server, for example, to reach a point P and cannot perform safe and efficient work.

Figure 2:
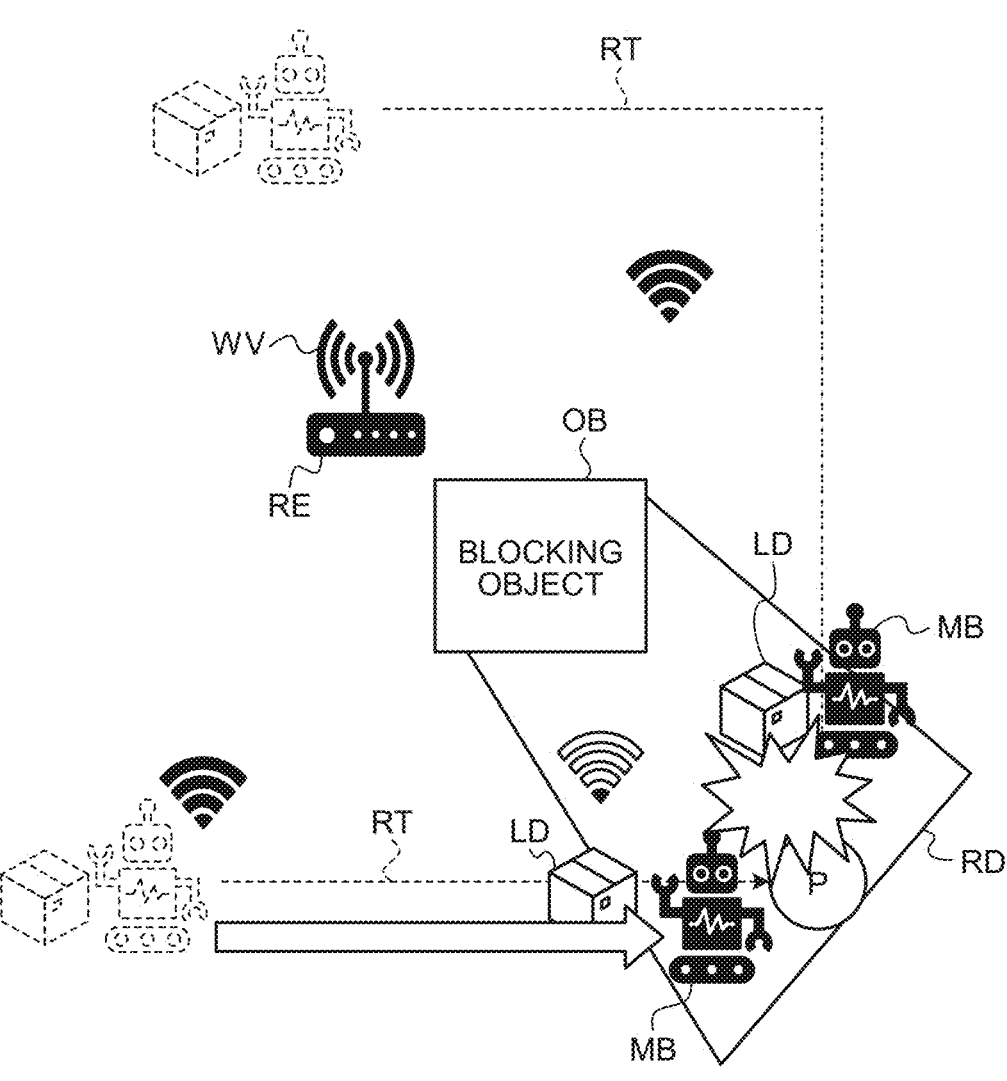
FIG. 2 is a diagram for explaining an example of a conventional measure.
Figure 3:
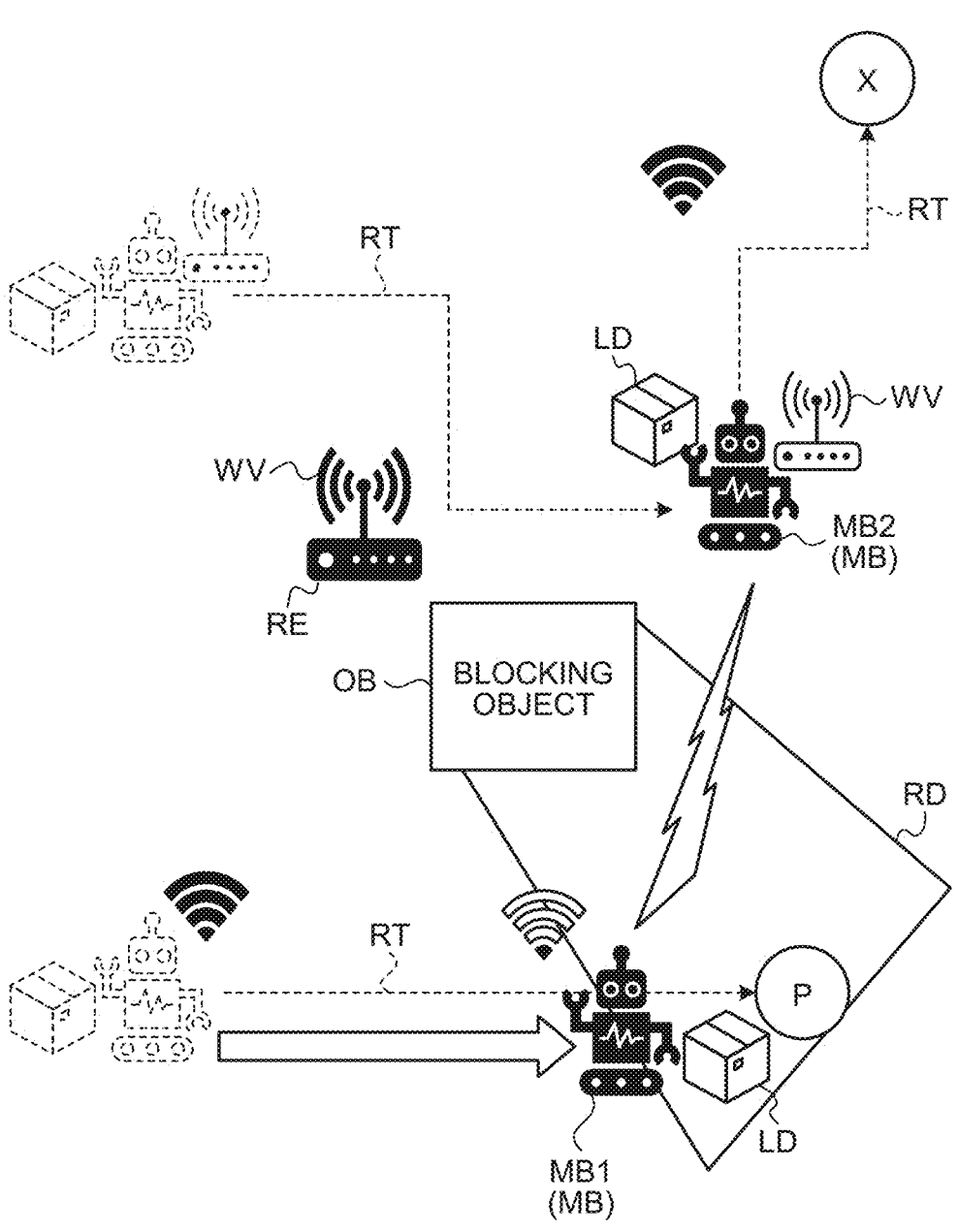
FIG. 3 is a diagram for explaining an example of a conventional measure.

In order to solve this problem, measures described in the citation list have been proposed. FIG. 2 and FIG. 3 are diagrams for explaining an example of the measures of the related art.

As illustrated in FIG. 2, the communication failure occurrence part RD is not sufficiently controlled by the server. Therefore, when a plurality of robots MB simultaneously enter the communication failure occurrence part RD, it is likely that the robots MB collide with one another or are stranded.

Therefore, Patent Literature 1 proposes a method of moving the robot MB to a communicable point based on a wireless environment map in which comprehensive wireless environment data such as radio intensities, noise floors, the numbers of errors, and the numbers of times of retransmission of points are recorded. However, in this method, a range in which the robot MB can move is limited based on the wireless environment map. The movement to the communication failure occurrence part RD is restricted and a task in the communication failure unit RD cannot be executed.

The example illustrated in FIG. 3 is a method proposed in Patent Literature 2. Patent Literature 2 proposes a method in which another robot MB2 serves as an access point and relays a radio wave to a robot MB1 that executes a task at a point where a radio wave WV is weak. However, this method has a problem in that the robot MB2 cannot be caused to execute a significant task while the radio wave is being relayed.

[1-2. Method of the Present Disclosure]

The present invention has been made in view of the problems described above. In the present disclosure, allowable complexity of a task (task complexity tolerance) is defined for each place in consideration of a communication environment or the like. Depending on the task complexity tolerance, constraints on route planning change. In the present disclosure, a map indicating a distribution of task complexity tolerance is generated and route planning for the robot MB is performed to satisfy constraints based on the map.

FIG. 4 is a diagram illustrating an overview of route planning of the present disclosure.

Figure 11:
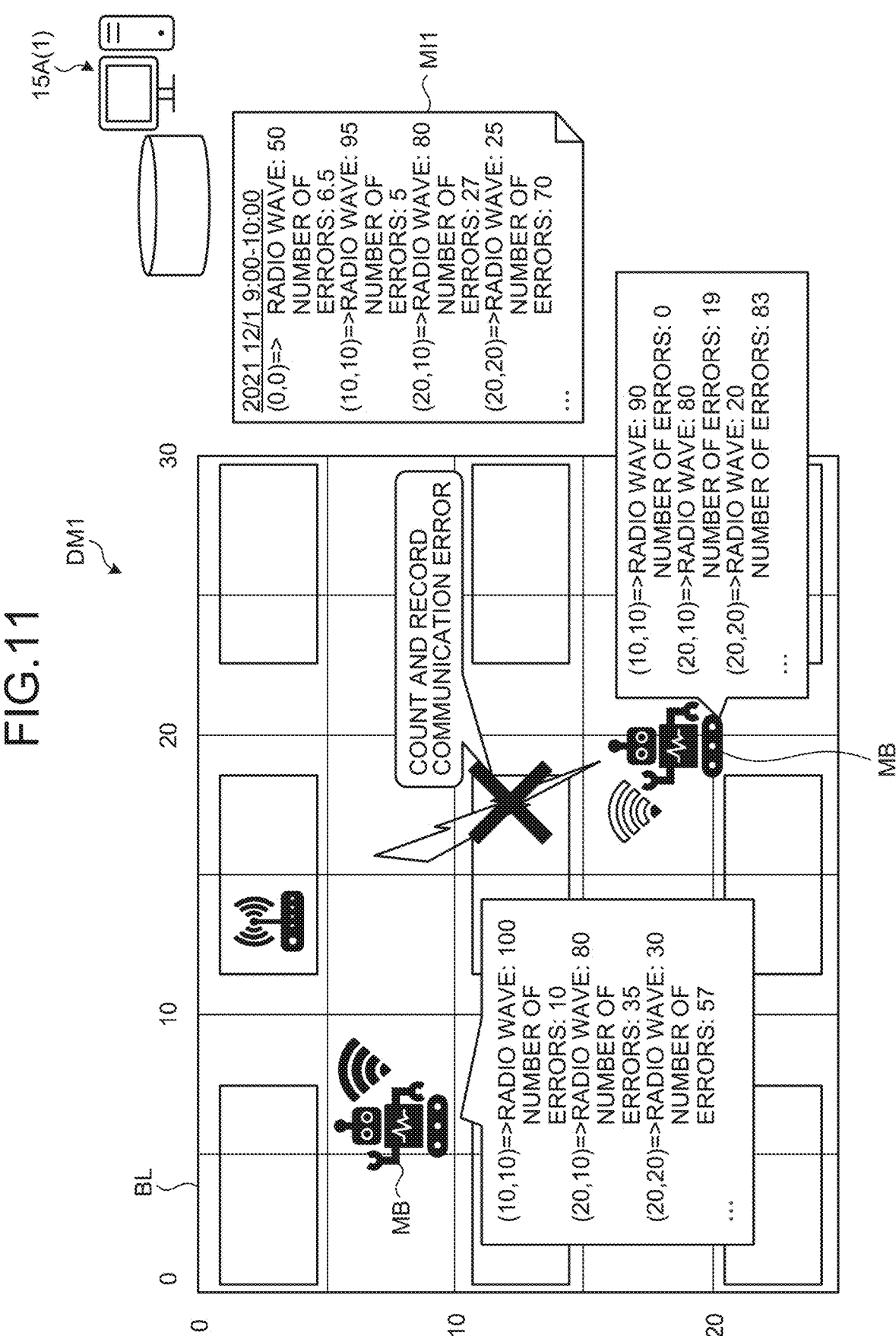
FIG. 11 is a diagram illustrating an example of a communication state map.

For example, a server 1 records a communication state such as radio wave intensity and the number of errors in a communication state map DM1 (see FIG. 11). In the communication state map DM1, fluctuation in a communication state due to a day of the week, a time period, or the like is also recorded. The server 1 plans tasks TK and moving routes of the robots MB such that complicated control becomes unnecessary in the communication failure occurrence part RD.

Specifically, a method of limiting the number of robots MB that can simultaneously enter the communication failure occurrence part RD to one or limiting traveling speed of the robot MB traveling to the communication failure occurrence part RD is adopted such that, for example, the robots MB do not pass each other or wait for each other. As the method of limiting the number of robots MB entering the communication failure occurrence part RD, a method of adjusting the route RT or changing the order of the tasks TK recorded in a task queue TQ is conceivable. In the example illustrated in FIG. 4, the number of robots MB simultaneously entering the communication failure occurrence part RD is adjusted by changing the order of a task TK1 and a task TK2.

The task TK around the communication failure occurrence part RD can be preferentially allocated to the robot MB2 having a relay function for the radio wave WV. In the example illustrated in FIG. 4, a point B is a position where the radio wave WV can be relayed to the communication failure occurrence part RD. Therefore, a task TK3 for carrying the conveyance object LD from a point X to the point B is preferentially allocated to the robot MB2. Accordingly, the communication environment in the communication failure occurrence part RD is supplemented. The method of the present disclosure is specifically explained below.

[2. Conveyance System of the Present Disclosure]

[2-1. Configuration of a Conveyance System]

Figure 5:
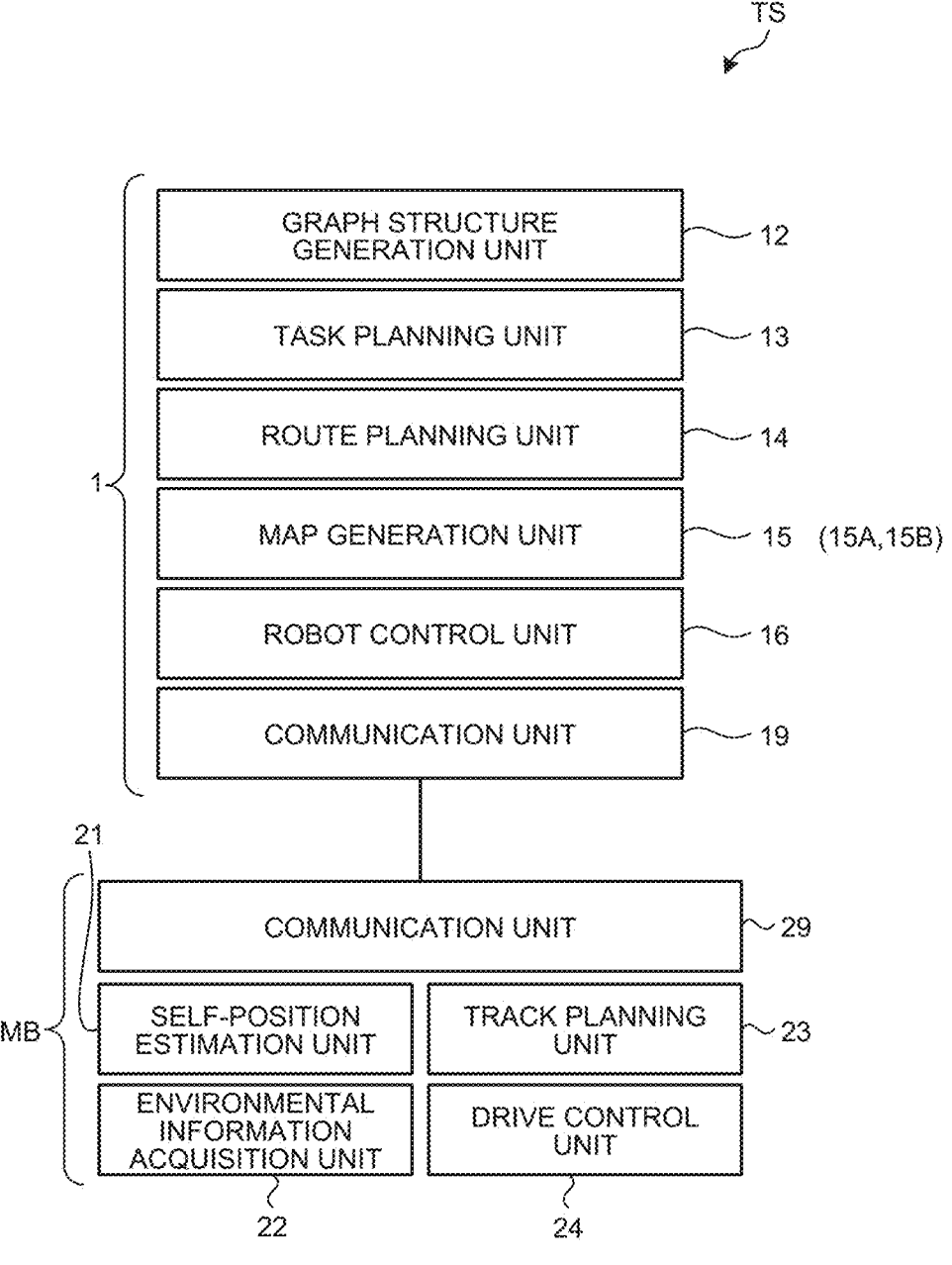
FIG. 5 is a diagram illustrating an example of a configuration of a conveyance system.

FIG. 5 is a diagram illustrating an example of a configuration of the conveyance system TS.

The conveyance system TS conveys the conveyance object LD using an autonomous mobile robot MB installed in a facility such as a distribution center. The conveyance system TS is a type of a mobile body system that causes a mobile body to carry out predetermined processing. The conveyance system TS includes the server 1 and the robot MB. The robot MB is connected to the server 1 via a network. The conveyance is executed by controlling the robot MB according to a conveyance instruction input to the server 1.

In the present disclosure, a system for the purpose of conveyance is explained. However, the route planning method of the present disclosure can also be applied to a system not for the purpose of conveyance. Examples of the system not for the purpose of conveyance include a monitoring system that regularly patrols a target area, a system that guides a guest visiting a store with the robot MB, and an automatic parking lot targeting automatic driving vehicles.

<Robot>

The robot MB is, for example, a trackless autonomous mobile robot that does not use a traveling rail. When a target point is given via a communication unit 29, the robot MB autonomously plans a track and moves to the target point. The robot MB incorporates sensors such as a camera, a GPS (Global Positioning System), a LiDAR (Light Detection and Ranging, a Laser Imaging Detection and Ranging), and an IMU (Inertial Measurement Unit).

The robot MB includes a self-position estimation unit 21, an environmental information acquisition unit 22, a track planning unit 23, a drive control unit, and the communication unit 29. The environmental information acquisition unit 22 acquires information (environmental information) concerning an external environment of the robot MB based on sensor data from the incorporated sensors. The environmental information includes information concerning a communication state at a traveling position and information concerning the obstacle OB. The self-position estimation unit 21 generates a peripheral map and estimates a self-position (the position of the robot MB) based on the environmental information using a technique such as SLAM.

The environmental information and the self-position information are supplied to the server 1 via communication units 19 and 29. The server 1 grasps communication states of points using the environmental information. The server 1 performs route planning based on information concerning the self-positions of the robots MB and the information concerning the communication states of the points. The information concerning the route planning is supplied to the robots MB via the communication units 19 and 29.

The track planning unit 23 detects the obstacle OB in the front based on the environmental information. The track planning unit 23 plans a desirable track for moving to a target point (the next node) while avoiding the obstacle OB. The track planning means control at a level of how far the robot MB should pass from a nearby obstacle OB and what kind of a curve the robot MB should draw to pass a corner in order to be able to safely and smoothly move.

a drive control unit 24 controls driving of the robot MB based on the route planning generated using the position information of the robots MB and the track planning determined based on the information concerning the obstacle OB and the like. The drive control also includes control concerning transfer processing for the conveyance object LD. By repeating the track planning and the drive control at a high frequency, it is possible to move safely even if there is a moving obstacle OB or the like.

In the example illustrated in FIG. 5, the trackless autonomous mobile robot is used as the robot MB. However, the robot MB is not limited thereto. The route planning method of the present disclosure is applicable to any robot MB that can control movement via communication. For example, the method of the present disclosure can also be applied to a tracked autonomous mobile robot using a traveling rail and the robot MB of a type that directly performs drive control from a remote location like a so-called radio-controlled robot.

<Server>

The server 1 is an information processing apparatus that processes various kinds of information for performing route planning. The server 1 controls the robot MB based on a conveyance instruction from the outside. The server 1 includes a graph structure generation unit 12, a task planning unit 13, a route planning unit 14, a map generation unit 15, a robot control unit 16, and the communication unit 19.

The map generation unit 15 calculates allowable complexity of a task as task complexity tolerance and generates a task complexity tolerance map DM2 indicating a distribution of the task complexity tolerance. A plurality of levels is set as the task complexity tolerance. For example, in the task complexity tolerance map DM2, the task complexity tolerance at any level among a first level large tolerance), a second level (middle tolerance), and a third level (small tolerance) is recorded at points. At these levels, the following constraints are imposed on the route planning.

<First Level: High Tolerance>

The plurality of robots MB can pass one another.

The plurality of robots MB can cooperate (for example, transfer the conveyance object LD).

<Second Level: Middle Tolerance>

The plurality of robots MB can pass one another.

Cooperation of the plurality of robots MB is limited.

<Third Level: Small Tolerance>

The number of robots MB that can simultaneously enter is limited to one.

Traveling speed of the robot MB is limited.

For example, the map generation unit 15 calculates task complexity tolerance at each time and each point based on a monitoring result of a communication state. The map generation unit 15 includes a communication state map generation unit 15A and a task complexity tolerance map generation unit 15B.

The communication state map generation unit 15A generates the communication state map DM1 based on a monitoring result of a communication state acquired from the robots MB. The monitoring result includes information concerning a traveling position, traveling time, and a communication state at the traveling position of the robot MB. The communication state includes information such as radio intensity, a noise floor, the number of errors, and the number of times of retransmission. The communication state map DM1 indicates a distribution of communication states in the facility. In the communication state map DM1, communication states at times and points are recorded.

The task complexity tolerance map generation unit 15B generates a task complexity tolerance map DM2 (see FIG. 12) based on the monitoring result of the communication state acquired from the robots MB. The task complexity tolerance map DM2 is a map indicating a distribution of the task complexity tolerance. The task complexity tolerance is small in a place where the communication state is bad. The task complexity tolerance is large in a place where the communication state is good.

For example, the task complexity tolerance map generation unit 15B calculates the distribution of the task complexity tolerance by applying the communication states at the times and the points recorded in the communication state map DM1 to a predetermined standard. The "distribution" means a distribution for each time and for each place. The task complexity tolerance map DM2 includes information concerning a distribution of task complexity tolerance for each time of time and each place.

The graph structure generation unit 12 detects the communication failure occurrence part RD based on the task complexity tolerance map DM2. For example, the communication failure occurrence part RD has task complexity tolerance in a range other than a level 1. The graph structure generation unit 12 sets a range in which the communication state is particularly bad in the communication failure occurrence part RD as an area AR where conflict between the robots MB is limited. For example, the graph structure generation unit 12 specifies a range (for example, a range in which the task complexity tolerance is a level 3) on the task complexity tolerance map DM2 in which the task complexity tolerance does not satisfy a tolerance standard. The graph structure generation unit 12 sets a plurality of graph elements GE present within a specified range as one area AR. The area AR includes a plurality of graph elements GE (nodes ND and edges ED) present in the communication failure occurrence part RD.

Capacities are set for the areas AR and the graph elements GE. The capacity indicates the number of robots MB permitted to be present at the same time. The graph structure generation unit 12 sets the capacities of the areas AR and the graph elements GE based on user input information. The graph structure generation unit 12 sets the capacities of all the areas AR and all the graph elements GE included in the graph MP to, for example, 1. The graph structure generation unit 12 generates the graph MP reflecting information concerning the areas AR and the capacities and supplies the graph MP to the route planning unit 14.

The task planning unit 13 allocates the most appropriate robot MB to a conveyance entity in view of content of a conveyance instruction. The task planning unit 13 subdivides work content of the robot MB serving as the conveyance entity and generates a task plan for causing the robot MB to carry out a plurality of subdivided tasks in order. The task planning unit 13 supplies the generated task plan to the drive control unit 24 of the robot MB serving as the conveyance entity.

For example, in the case of a conveyance instruction "carry a conveyance object from a point A to a point B", the task planning unit 13 decomposes the task TK indicated by the conveyance instruction into a movement task to the point A, a task of loading the conveyance object LD at the point A, a movement task to the point B, and an unloading task of the conveyance object LD at the point B. The task planning unit 13 generates a task plan for causing the robot MB serving as the conveyance entity to execute a plurality of subdivided tasks in order.

Various methods are conceivable as a method of determining the robot MB serving as the conveyance entity. For example, when all the robots MB are empty robots MB having no task TK, the empty robot MB closest to a destination of a movement task can be determined as the conveyance entity. When there is no empty robot MB, the robot MB having the smallest allocated task TK can be determined as the conveyance entity. The task planning unit 13 can also preferentially allocate, to the robot MB having a relay function for the radio wave WV, the task TK at a position where the radio wave WV can be relayed to the area AR.

The route planning unit 14 determines which route RT the robots MB should follow to move to destinations of the robots MB. Here, the route planning means performing, based on a one-lane passage or the like where the robots MB cannot pass each other, planning at a level of which robot MB should pass through which passage in which order. The route planning unit 14 performs route planning for the robot MB to satisfy constraints based on the task complexity tolerance map DM2.

For example, the route planning unit 14 acquires information concerning the area AR and the capacity from the graph MP. The route planning unit 14 performs the route planning for the robot MB such that conflict of the robot MB exceeding the capacity of the area AR does not occur within the area AR determined based on the task complexity tolerance map DM2. The conflict means that the robot MB cannot reach a goal because of collision or a deadlock between the robots MB.

Examples of a method of avoiding conflict in the area AR include (i) a method of adjusting order of carrying out a plurality of tasks TK accumulated in the task queue TQ, (ii) a method of adjusting moving speed of one or more robots MB traveling to the area AR, and (iii) a method of adjusting a period of carrying out the task TK. The adjustment of the moving speed can be processed as adjustment of moving cost.

For example, first, the route planning unit 14 calculates shortest routes of the robots MB without considering conflict in the area AR, the node ND, and the edge ED. A search for the shortest routes is performed using a publicly-known method such as A*. When conflict occurs in any one of the area AR, the node ND, and the edge ED in the calculated shortest routes of the robots MB, the route planning unit 14 calculates the shortest routes of the robots MB again with a part where the conflict has occurred as a constraint. By repeating this, the route planning unit 14 searches for a set of the routes RT of the robots MB in which no conflict occurs.

The route planning unit 14 generates route information of the robots MB based on finally obtained routes RT of the robot MB. The route information includes information concerning a moving destination and a moving time (moving timing) of the robot MB. The route planning unit 14 supplies the route information of the robots MB to the robot control unit 16.

When the robot MB to which a moving destination is added a new is generated, the route planning unit 14 may perform additional route planning only for the robot MB to which the moving destination is added anew without changing the route planning of the other robots MB or may perform the overall optimization including review of the route plan of the other robots MB.

The robot control unit 16 generates a movement instruction for the robots MB based on the route information of the robots MB. The movement instruction includes information concerning a moving destination and moving time (moving timing) of the robot MB. The movement instruction may be generated as a row of data about which graph elements GE the robot MB passes through in which order. The robot control unit 16 transmits the movement instruction for the robots MB to the robots MB via the communication unit 19.

[2-2. Graph Structure]

Figures 6, 7:
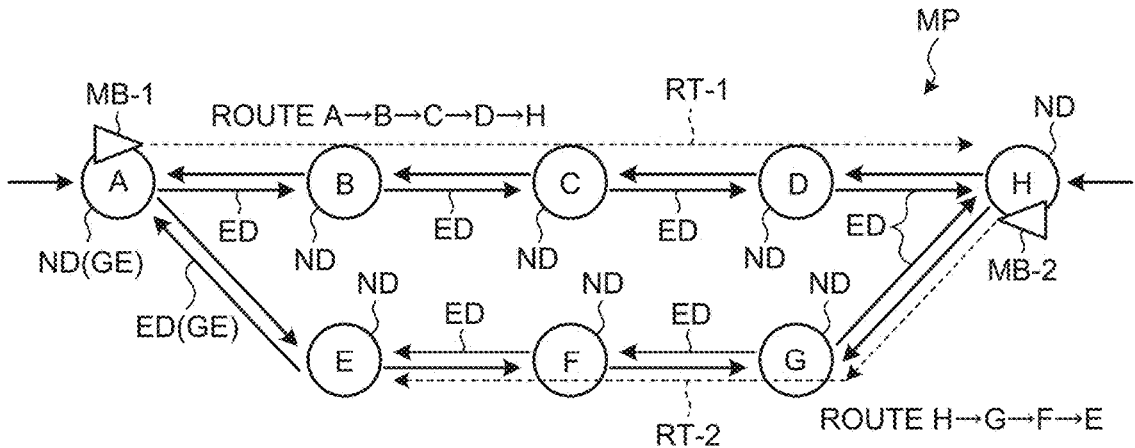
FIG. 6 is a diagram illustrating an example of a graph used as a route map.
FIG. 7 is a diagram illustrating an example of route planning.

FIG. 6 is a diagram illustrating an example of the graph MP used as a route map.

As explained above, the route planning is one of basic problems for the autonomous mobile robot MB. In order to efficiently obtain a shortest route, the graph MP illustrated in FIG. 6 is used. The graph MP includes the node ND and the edge ED as the graph elements GE. The graph MP is a topological map including points A, B, C, D, E, F, G, and H, as well as routes RT-1 and RT-2, representing environment in which the robot MB moves. The graph MP is created based on, for example, the arrangement of the obstacle OB in the environment. The graph MP is an undirected graph in some cases and is a directed graph in other cases (capable of expressing one-way traffic). FIG. 6 illustrates an example of the directed graph.

Figure 8:
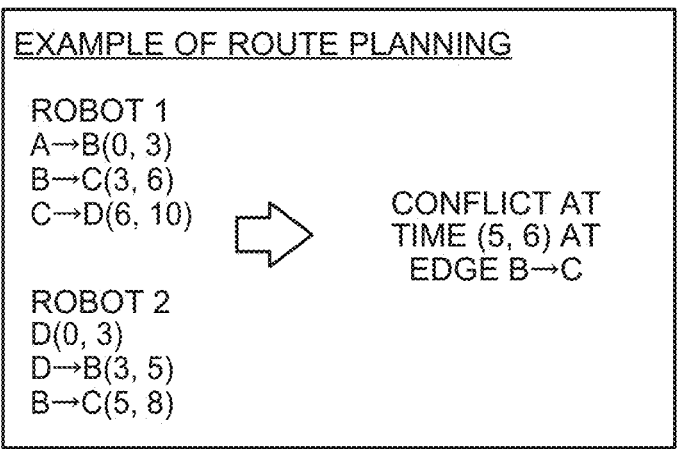
FIG. 8 is a diagram illustrating an example of route planning.

FIG. 7 and FIG. 8 are diagrams illustrating an example of route planning.

The route planning is represented by, for example, the nodes ND and the edges ED through which the robot MB passes and a series of times when the robot MB passes through the nodes ND and the edges ED. When the robot MB passes through the edge ED, the route planning is represented by time when the robot MB departs the node ND at one end of the edge ED and time when the robot MB arrives at the other node ND. When the robot MB waits at the node ND, the route planning is represented by a start time and an end time of the waiting. An array of passage times of the edges ED and waiting times at the nodes ND from a start point (the node ND) to a goal point (the node ND) is the route planning.

When a plurality of different robots MB wait at the same node ND or pass through the same edge ED at the same time, the routes RT of the robots MB are regarded as being in conflict (also referred to as interfere). In route planning for a plurality of robots, a set of routes RT without conflict is required. The set of routes RT without conflict is calculated by a graph search algorithm such as a CBS (Conflict-Based Search).

In most of plural-robot route planning algorithms, there is processing of checking for conflict in the route RT. In the check of conflict of the route RT, it is checked whether there is an overlap of staying time of the robots MB at the node ND or passing time of the robots MB through the edge ED respectively for all the nodes ND and the edges ED of the graph MP. When there is at least one time overlap, a set of routes RT of the robots MB is regarded as being in conflict, and another set of routes RT is searched for.

Figure 9:
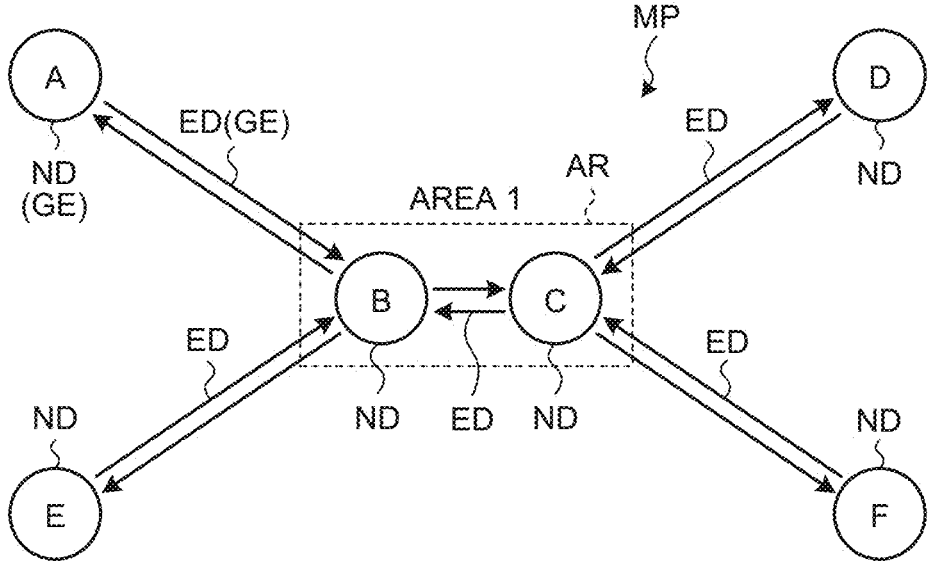
FIG. 9 is an explanatory diagram of a route search method considering an area.

[2-3. Route Search Method Considering an Area]FIG. 9 is an explanatory diagram of a route search method considering the area AR.

In the route search method considering the area AR, conflict of the routes RT is detected in a plurality of graph elements GE. This route search method includes the following three points.

(Point 1) The plurality of graph elements GE is grouped (the grouped plurality of graph elements GE is referred to as "area".)

(Point 2) A capacity is set for each area AR.

(Point 3) Route planning is performed considering the setting of the area AR.

First, a method of grouping the graph elements GE is explained. The grouping (the area AR) has the following characteristics.

(Characteristic 1) The grouped graph elements GE belong to the area AR.

(Characteristic 2) The individual graph elements GE can belong to a plurality of areas AR or can belong to no area AR.

(Characteristic 3) The node ND and the edge ED may be mixed in the same area AR.

(Characteristic 4) The area AR has a numerical value called capacity. The capacity represents the number of robots MB that can simultaneously enter the area AR.

FIG. 10 is a diagram for explaining the route planning method considering the area AR.

In the examples illustrated in FIG. 7 and FIG. 8, the route planning that is a set of "the edge ED through which the robot MB passes or the node ND+the time at which the robot MB waits" is converted into a set of "the area AR+time through and at which the robot MB passes or waits". An example of the conversion into "the area AR+time through and at which the robot MB passes or waits" is explained below.

In the example illustrated in FIG. 10, the conversion into "the area AR+time" is performed based on information concerning the area AR to which the node ND and the edge ED belong. A robot MB-1 reaches the node B at time "4", waits for one second, thereafter moves from the edge B to an edge C, and leaves a node C at time "7".

Since the node B, the edge B to the edge C, and the node C belong to the same area AR, a stay time (period) in the area AR is (4, 7). Similarly, a stay time in the area AR of a robot MB-2 can be converted into (3, 5). After the area conversion, it is checked whether stay times overlap in the same area AR. In the example illustrated in FIG. 10, the robot MB-1 and the robot MB-2 are regarded as conflicting in the area AR at time (4, 5). Therefore, it is necessary to search for another route RT.

The above is an example of conflict detection in the case in which the capacity of the area AR is one. When the capacity is generalized, it is determined that conflict occurs when the number of robots MB, stay times of which overlap in the same area AR, exceeds the capacity of the area AR. The robots MB as many as the number indicated by the capacity are allowed to be simultaneously present in the same area AR.

[2-4. Communication State Map]

FIG. 11 is a diagram illustrating an example of the communication state map DM1.

The communication state map DM1 is a map in which a communication state (radio intensity, noise floor, the number of errors, the number of times of retransmissions, and the like) at points and times of a facility where the robot MB operates is recorded. The communication state map DM1 includes information MI1 indicating a distribution of communication states in the facility. The communication state is monitored by the robots MB moving in the facility. The robots MB sequentially transmit, to the server 1, monitoring results of the communication state collected at every fixed time. The communication state map DM1 is generated based on the monitoring results transmitted from the robots MB.

For example, the communication state map generation unit 15A divides an operation space in the facility into a plurality of blocks BL. In the example illustrated in FIG. 11, the operating space is divided into 5×6 blocks BL by dividing the operation space at fixed intervals in a row direction and a column direction. The communication state map generation unit 15A sequentially acquires monitoring results of communication states from the robots MB. The communication state map generation unit 15A calculates communication states of all the blocks BL at times using a method such as interpolation processing. Accordingly, the communication state map DM1 in which the communication states at the times are recorded is generated for each of the blocks BL.

[2-5. Task Complexity Tolerance Map]

Figure 12:
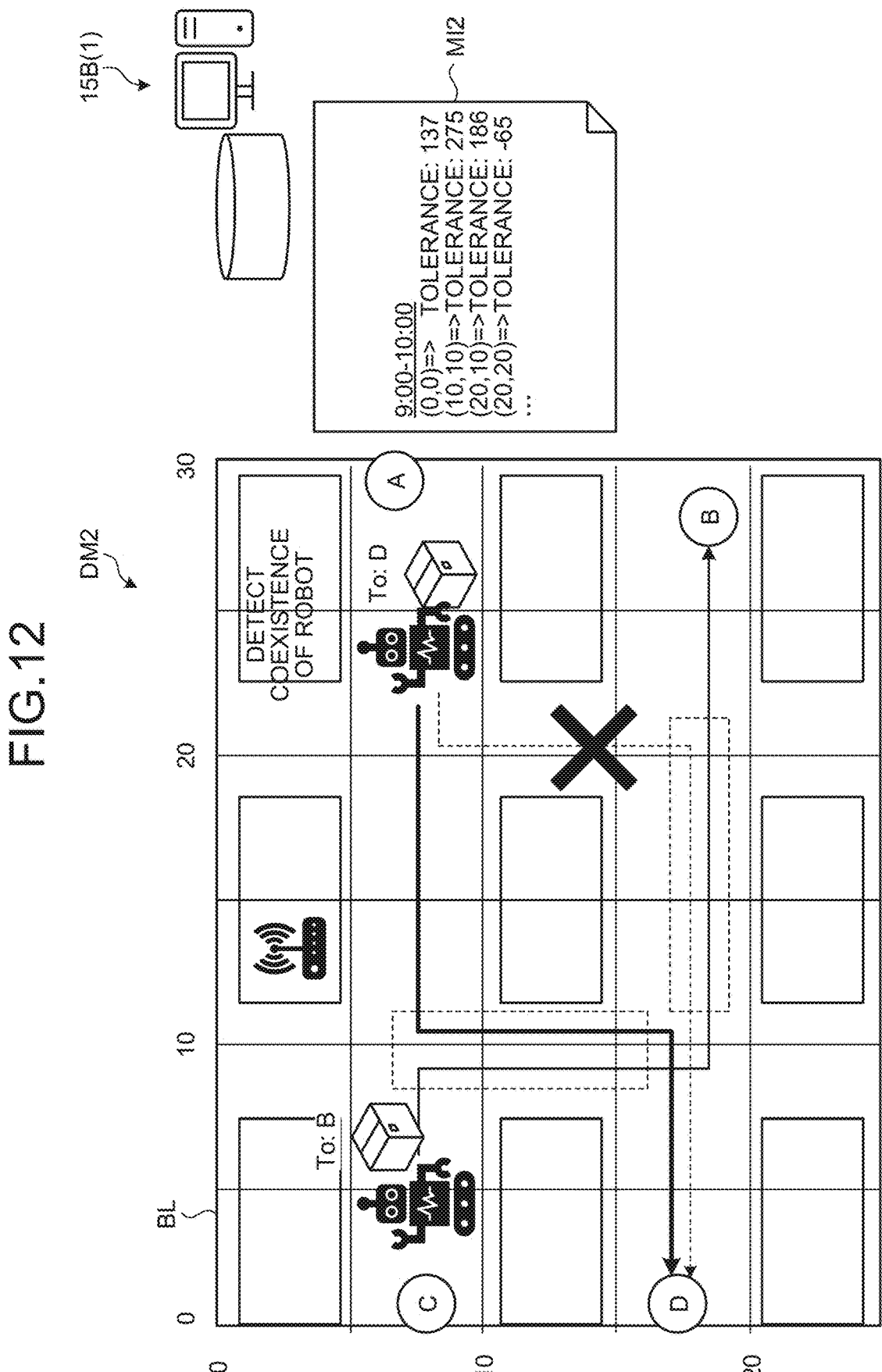
FIG. 12 is a diagram illustrating an example of a task complexity tolerance map.
Figure 13:
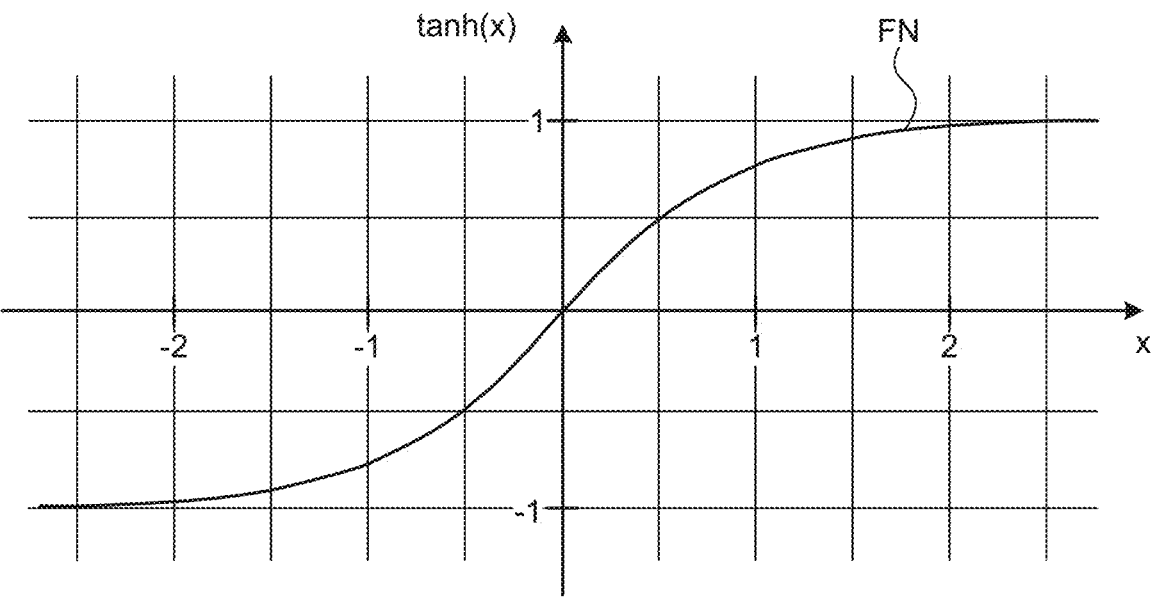
FIG. 13 is a diagram for explaining an example of a method of calculating task complexity tolerance.

FIG. 12 is a diagram illustrating an example of the task complexity tolerance map DM2. FIG. 13 is a diagram for explaining an example of a method of calculating task complexity tolerance.

The task complexity tolerance map DM2 is a map in which task complexity tolerance at points and times of the facility in which the robot MB operates are recorded. The task complexity tolerance map DM2 includes information MI2 indicating a distribution of the task complexity tolerance. The task complexity tolerance is determined based on a communication status. For example, the task complexity tolerance map generation unit 15B applies communication states of the blocks BL recorded in the communication state map DM1 to a predetermined function (a tolerance function) and calculates task complexity tolerance for each of the blocks BL.

The tolerance function is determined based on, for example, the following procedure. First, execution communication speed considering a communication error is measured or calculated. The execution communication speed is converted into a database in correlation with the communication state. Subsequently, a frequency of commands that can be transmitted and received between the server 1 and the robot MB is estimated and the complexity of the allowable task TK is evaluated. Subsequently, allowable complexity of the task TK is converted into a numerical value. A function for associating the numerical value and the communication state is determined as a tolerance function.

Examples of the complexity of the task TK include the following. For example, if a command frequency per second is smaller than one, the number of robots MB that can enter at the same time is limited to one. If the command frequency per second is smaller than 30, merging of the robots MB is permitted. If the command frequency per second is smaller than 50, passing of the robots MB each other is permitted. If the command frequency per second is 50 or larger, cooperation between the robots MB is permitted. The complexities of the task TK are individually converted into numerical values and determined as task complexity tolerance.

For example, the task complexity tolerance is calculated using a tolerance function, a value of which is larger as radio wave intensity is higher and the number of communication error is smaller. The tolerance function may be a linear function or may be a nonlinear function. For example, the radio wave intensity is represented as $\alpha$, the number of communication errors is represented as $\beta$, and the task complexity tolerance is represented as $\gamma$. As an example of the linear function, $\gamma=3\times\alpha-2\times\beta$ and the like are conceivable. As an example of the nonlinear function, $\gamma=\tanh(\alpha-\beta)$ and the like are conceivable. FIG. 13 is a diagram illustrating a relation FN between $x(=\alpha-\beta)$ and $\gamma$ in the case in which a hyperbolic tangent function is used as the tolerance function.

[3. First Form of Route Planning]

FIG. 14 to FIG. 17 are diagrams for explaining a first form of the route planning.

Figure 14:
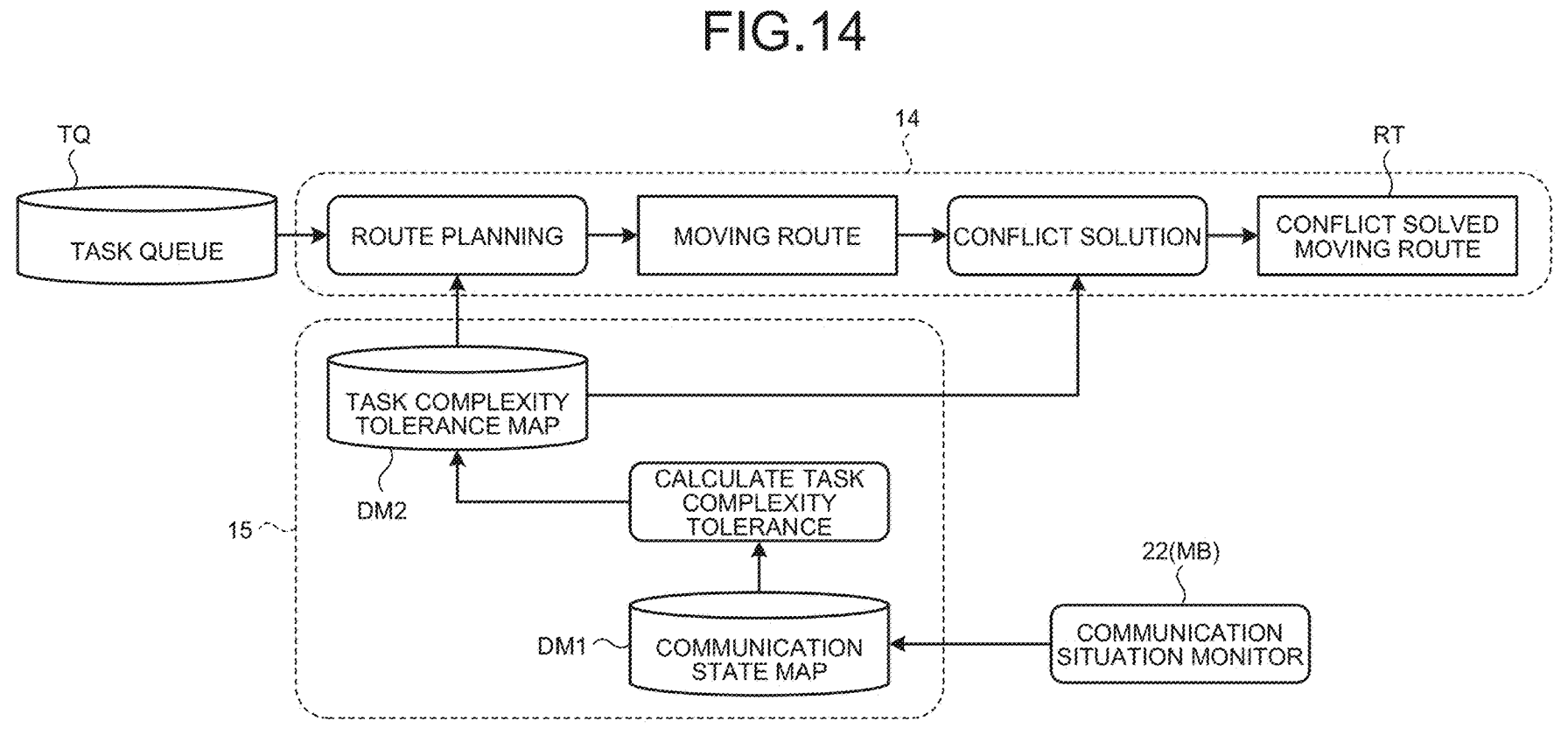
Figure 15:
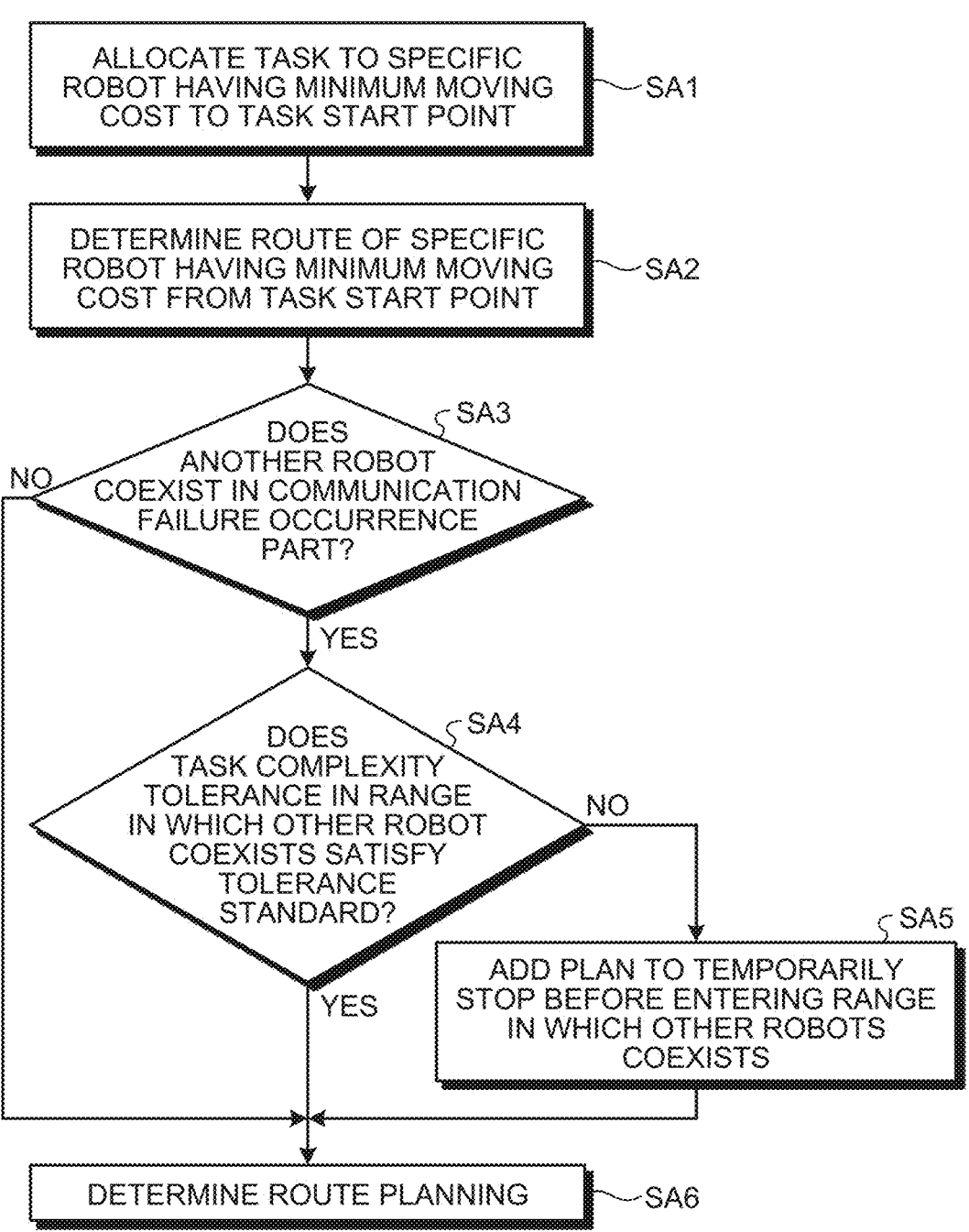
FIG. 15 is a diagram for explaining the first form of the route planning.
Figure 16:
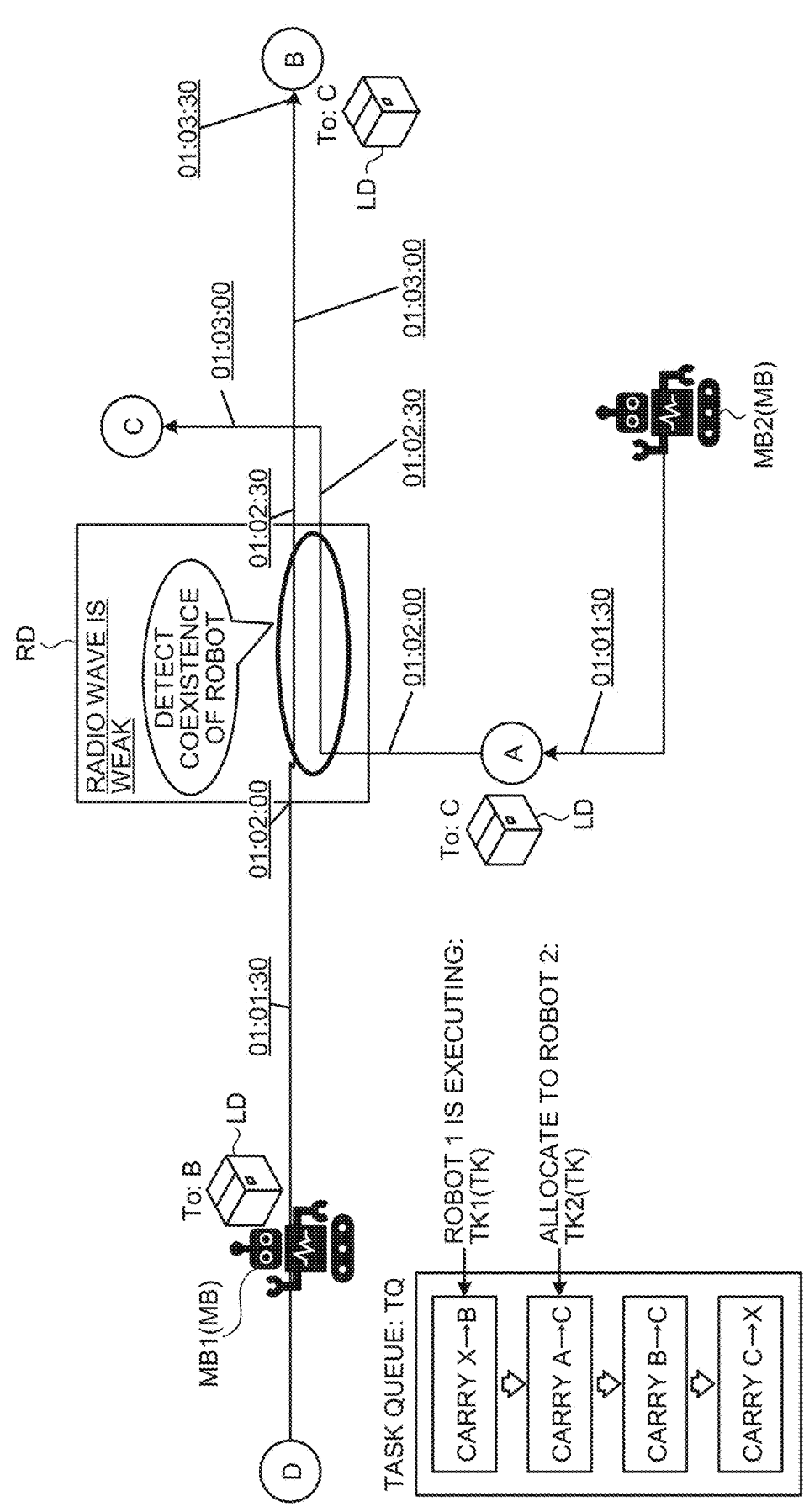
FIG. 16 is a diagram for explaining the first form of the route planning.
Figure 17:
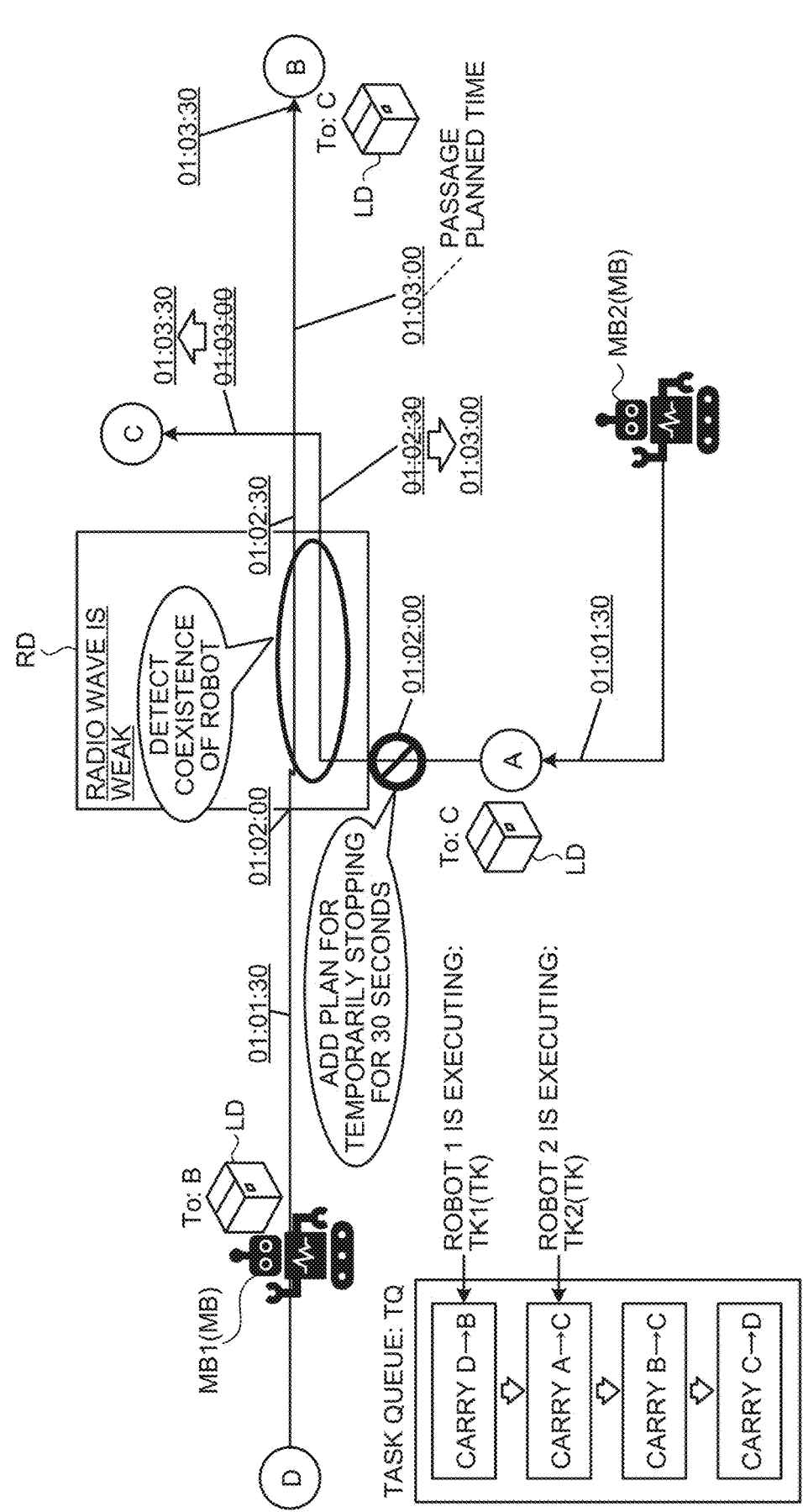
FIG. 17 is a diagram for explaining the first form of the route planning.

In this form, a route is adjusted by a temporary stop or a route is changed to a route allowing robots to pass each other in a safe place not to require control of passing and waiting in a place where a communication environment is unstable. FIG. 14 and FIG. 15 are diagrams illustrating a flow of processing. FIG. 16 is a diagram illustrating a coexistence state of the robots MB that occurs in the communication failure occurrence part RD. FIG. 17 is a diagram for explaining a change in route planning in the case in which the coexistence state is detected. Processing of the server 1 is explained below with reference to a flowchart of FIG. 15.

The task planning unit 13 allocates the task TK2 extracted from the task queue TQ to the robot MB2 having minimum moving cost to a task start point A (for example, a place where the conveyance object LD is present) (step SA1). The route planning unit 14 calculates a route of the robot MB2 having the minimum moving cost from the task start point A (step SA2).

The route planning unit 14 determines whether the other robot MB1 to which the task TK1 has already been assigned and the robot MB2 coexist in the communication failure occurrence part RD (step SA3). If the other robot MB1 does not coexist in the communication failure occurrence part RD (step SA3: No), the route planning unit 14 determines the route calculated in step SA2 as the route RT of the robot MB2 (step SA6).

When the other robot MB1 coexists in the communication failure occurrence part RD (step SA3: Yes), the route planning unit 14 determines whether task complexity tolerance in a range in which the other robot MB1 coexists satisfies a tolerance standard (step SA4). For example, if the task complexity tolerance in the range in which the other robot MB1 coexists is the level 1 or the level 2, it is determined that task complexity tolerance satisfies the tolerance standard. If the task complexity tolerance in the range in which the other robot MB1 coexists satisfies the tolerance standard (step SA4: Yes), the route planning unit 14 determines the route calculated in step SA2 as the route RT of the robot MB2 (step SA6).

If the task complexity tolerance in the range in which the other robot MB1 coexists does not satisfy the tolerance standard (step SA4: No), the route planning unit 14 adds a plan to temporarily stop the robot MB2 before the robot MB2 enters the range in which the other robot MB1 coexists (step SA5). The route planning unit 14 determines, as the route RT of the robot MB2, a new route obtained by adding the plan to temporarily stop the robot MB2 to the route calculated in step SA2 (step SA6).

[4. Second Form of Route Planning]

Figure 18:
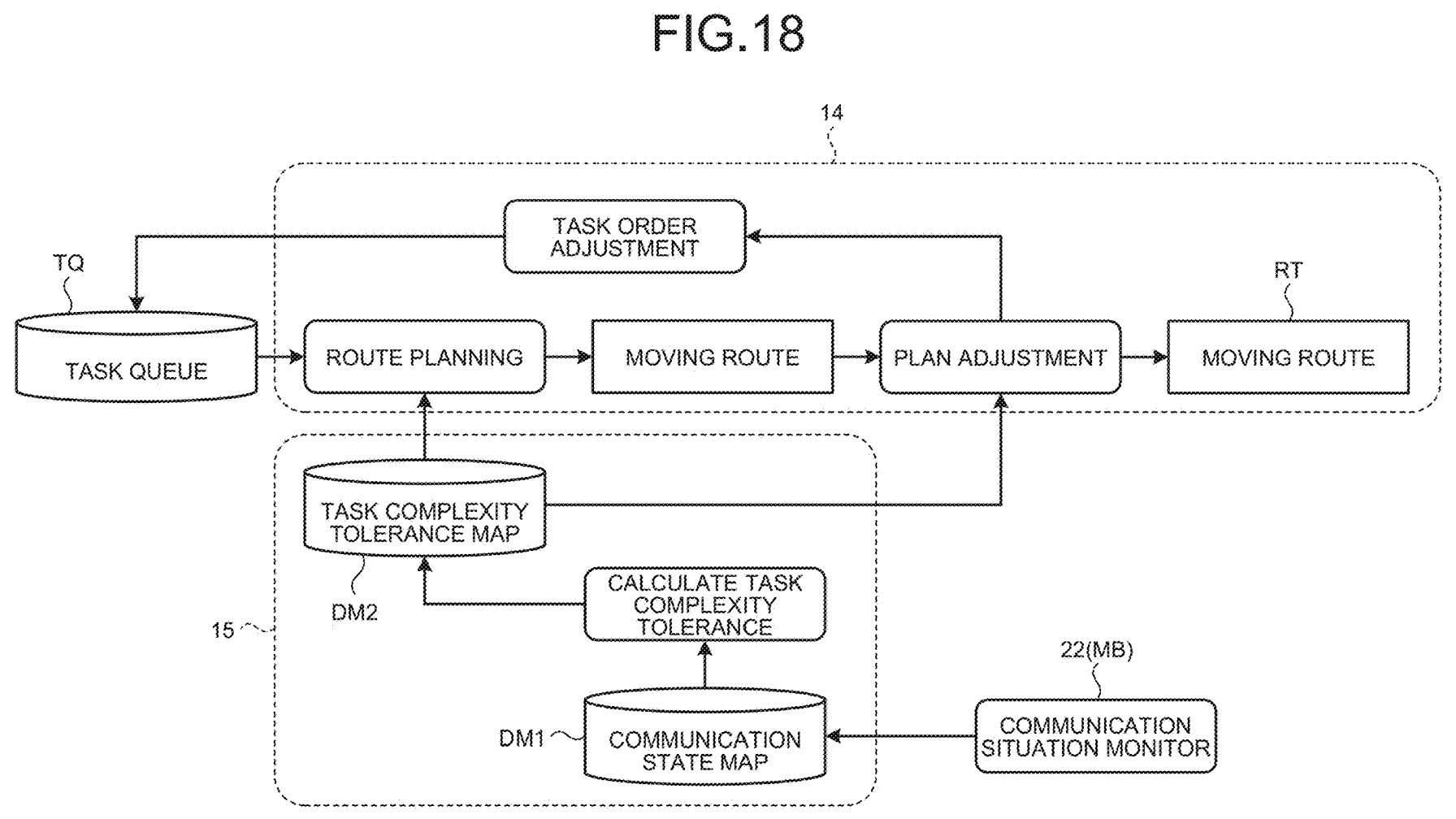
Figure 20:
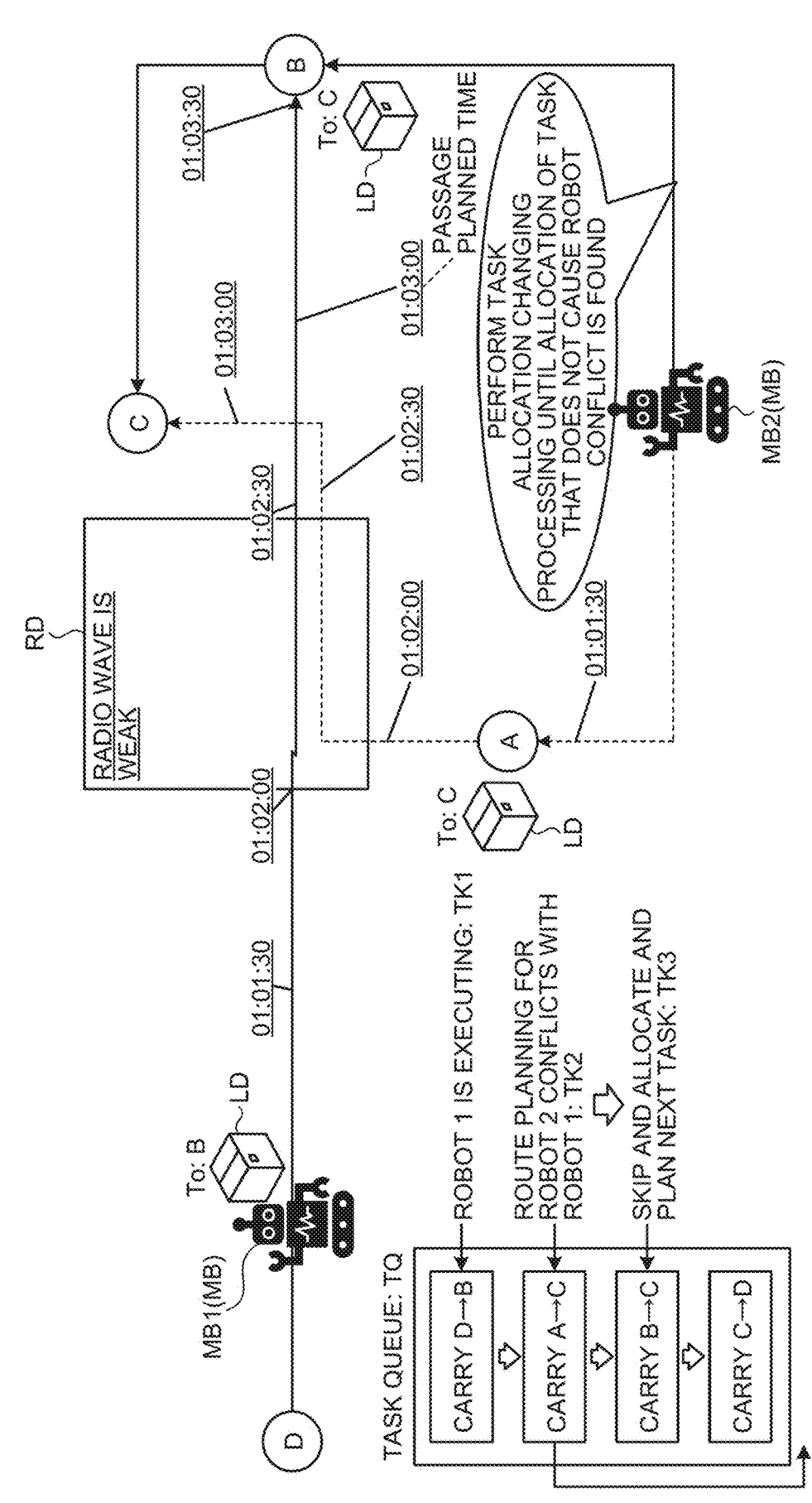
FIG. 20 is a diagram for explaining the second form of the route planning.

FIG. 18 to FIG. 20 are diagrams for explaining a second form of the route planning.

In this form, the tasks TK are rearranged such that a coexistence state of the robots MB does not occur in the communication failure occurrence part RD. FIGS. 18 and 19 are diagrams illustrating a flow of processing. FIG. 20 is a diagram illustrating processing of rearranging the tasks TK in the case in which the coexistence state is detected. Processing of the server 1 is explained below with reference to a flowchart of FIG. 19.

The task planning unit 13 extracts the task TK2 from the task queue TO (step SB1) and allocates the task TK2 to the robot MB2 having minimum moving cost to the task start point A (for example, a place where the conveyance object LD is present) (step SB2). The route planning unit 14 calculates a route of the robot MB2 having the minimum moving cost from the task start point A. The route planning unit 14 determines whether the other robot MB1 to which the task TK1 has already been assigned and the robot MB2 coexist in the communication failure occurrence part RD (step SB3).

When the other robot MB1 does not coexist in the communication failure occurrence part RD (step SB3: No), the task planning unit 13 decides the allocation of the task TK2 to the robot MB2 determined in step SB2 (step SB6). The route planning unit 14 decides the route calculated in step SB2 as the route RT of the robot MB2.

When the other robot MB1 coexists in the communication failure occurrence part RD (step SB3: Yes), the route planning unit 14 determines whether the task complexity tolerance in a range in which the other robot MB1 coexists satisfies the tolerance standard (step SB4). For example, if the task complexity tolerance in the range in which the other robot MB1 coexists is the level 1 or the level 2, it is determined that task complexity tolerance satisfies the tolerance standard.

When the task complexity tolerance in the range in which the other robot MB1 coexists satisfies the tolerance standard (step SB4: Yes), the task planning unit 13 decides the allocation of the task TK2 to the robot MB2 determined in step SB2 (step SB6). The route planning unit 14 decides the route calculated in step SB2 as the route RT of the robot MB2.

When the task complexity tolerance in the range in which the other robot MB1 coexists does not satisfy the tolerance standard (step SB4: No), the task planning unit 13 returns the task TK2 extracted in step SB1 to the end of the task queue TQ (step SB5). Then, the task planning unit 13 extracts the task TK3 registered next to the task TK2 from the task queue TO (step SB1) and repeats step SB2 and subsequent steps.

[5. Application Example of a Route Search Method of Present Disclosure]

Figure 21:
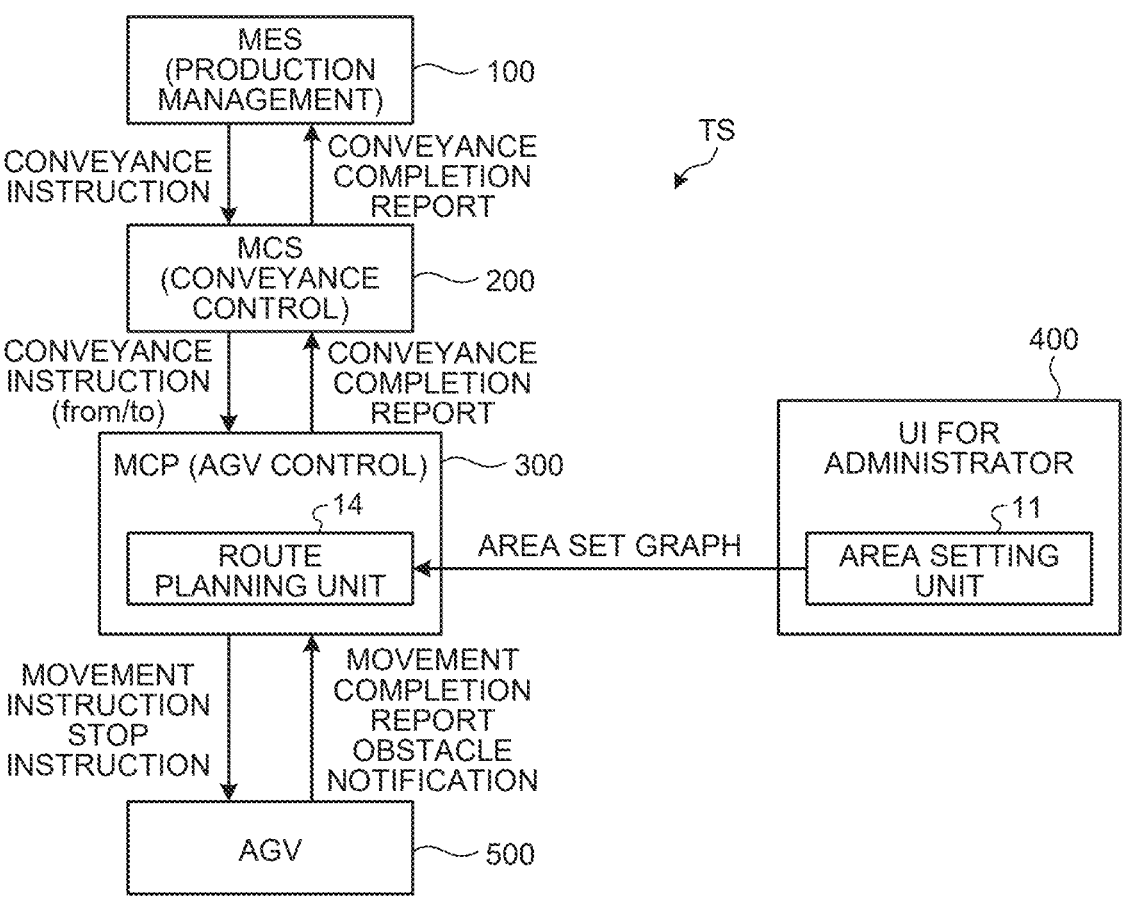
FIG. 21 is a diagram illustrating an example in which a route search method of the present disclosure is applied to an automatic conveyance system in a factory in which an automatic conveyance vehicle is used.

FIG. 21 is a diagram illustrating an example in which the route search method of the present disclosure is applied to an automatic conveyance system in a factory in which an automated guided vehicle (AGV) is used.

The conveyance system TS includes a production management system (MES) 100, a conveyance control system (MCS) 200, an AGV control system (MCP) 300, and an AGV 500. The MES 100 issues a conveyance instruction to the MCS 200 based on a manufacturing process. The conveyance instruction here is, for example, "convey C from a device A to a device B". Based on the received conveyance instruction, the MCS 200 determines by which AGV 500 how to convey C and further issues a conveyance instruction to the MCP 300. The conveyance instruction here is, for example, "the AGV (determined as conveying means) conveys C from the point A to the point B".

When receiving the conveyance instruction, the MCP 300 determines a specific moving route of the AGV 500. Here, a route planning system considering the area setting of the present disclosure is used. An administrator of the system can add, change, and delete area settings using a UI 400 for the administrator. For example, when a layout of the factory is changed, the administrator changes the area setting via an area setting unit 11. The route planning unit 14 can perform the route planning by reflecting the changed area setting. In addition, the administrator can refer to the area AR set on the UI.

[6. Hardware Configuration Example]

Figure 22:
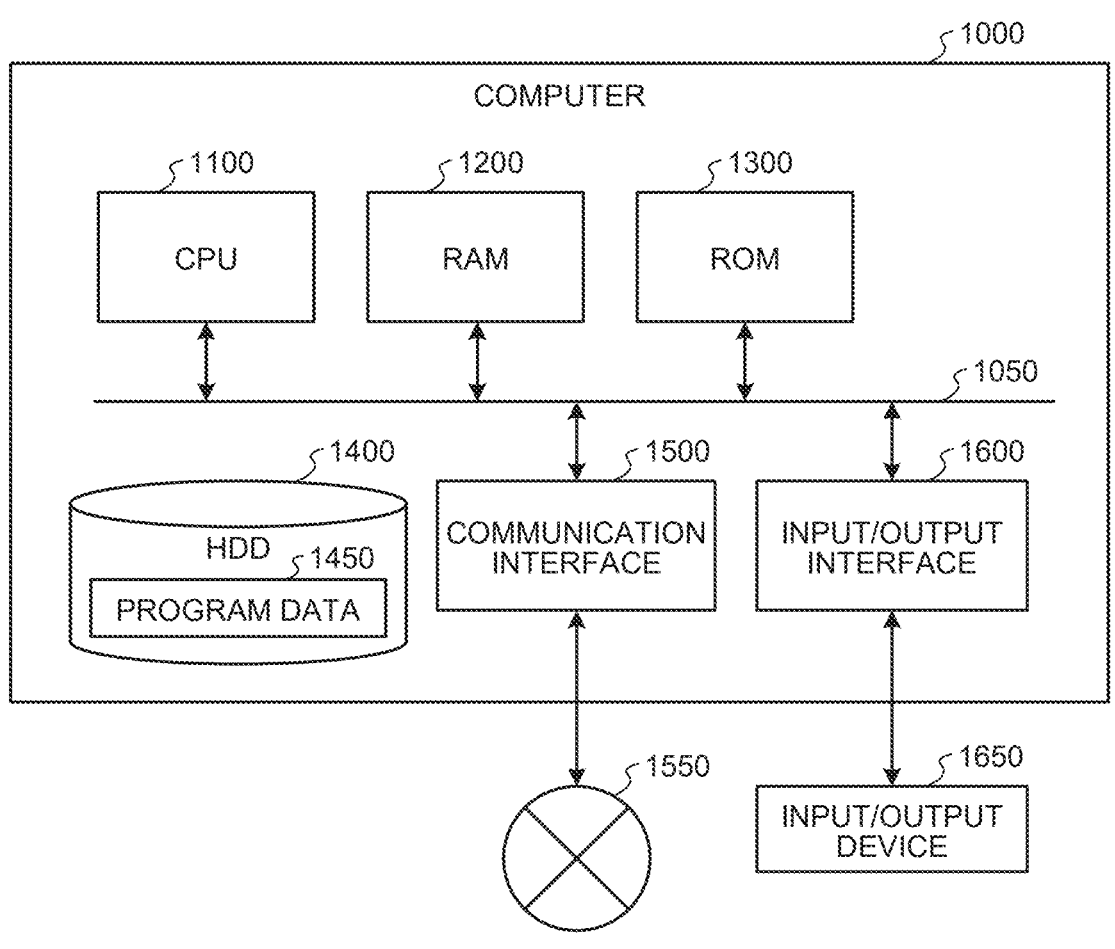
FIG. 22 is a diagram illustrating a hardware configuration example of a server.

FIG. 22 is a diagram illustrating a hardware configuration example of the server 1. For example, the server 1 is implemented by a computer 1000. The computer 1000 includes a CPU 1100, a RAM 1200, a ROM (Read Only Memory) 1300, a HDD (Hard Disk Drive) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 loads the programs stored in the ROM 1300 or the HDD 1400 in the RAM 1200 and executes processing corresponding to various programs.

The ROM 1300 stores a boot program such as a BIOS (Basic Input Output System) executed by the CPU 1100 at a start time of the computer 1000, a program depending on hardware of the computer 1000, and the like.

The HDD 1400 is a computer-readable recording medium that non-transiently records programs executed by the CPU 1100, data (including various databases) used by the programs, and the like. Specifically, the HDD 1400 is a recording medium that records an information processing program according to the present disclosure, which is an example of program data 1450.

The communication interface 1500 is an interface for the computer 1000 to be connected to an external network 1550 (for example, the Internet). For example, the CPU 1100 receives data from other equipment and transmits data generated by the CPU 1100 to the other equipment via the communication interface 1500.

The input/output interface 1600 is an interface for connecting an input/output device 1650 and the computer 1000. For example, the CPU 1100 receives data from an input device such as a keyboard or a mouse via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (medium). The medium is, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, or a semiconductor memory.

For example, when the computer 1000 functions as the server 1, the CPU 1100 of the computer 1000 implements the various functions explained above by executing a program loaded on the RAM 1200. The HDD 1400 stores a program for causing a computer to function as the server 1. Note that the CPU 1100 reads the program data 1450 from the HDD 1400 and executes the program data 1450. However, as another example, the CPU 1100 may acquire these programs from another device via the external network 1550.

[7. Effects]

The server 1 includes the map generation unit 15 and the route planning unit 14. The map generation unit 15 calculates complexity of the allowable task TK as task complexity tolerance and generates the task complexity tolerance map DM2 indicating a distribution of the task complexity tolerance. The route planning unit 14 performs route planning for the robot MB to satisfy constraints based on the task complexity tolerance map DM2. In an information processing method of the present disclosure, the processing of the server 1 is executed by the computer 1000. A program of the present disclosure causes the computer 1000 to implement the processing of the server 1.

With this configuration, the complexity of the task TK is adjusted according to the task complexity tolerance. Therefore, the task TK is efficiently and safely performed even in a place where the motion of the robot MB becomes unstable.

The map generation unit 15 calculates task complexity tolerance at each time and each point based on a monitoring result of a communication state.

With this configuration, an appropriate task complexity tolerance corresponding to a communication environment is set.

The route planning unit 14 performs route planning such that conflict of the robots MB exceeding the capacity of the area AR does not occur in the area AR determined based on the task complexity tolerance map DM2.

With this configuration, the number of robots MB that can enter at the same time is limited according to the communication state. Therefore, a task is efficiently and safely performed even in a place where a communication environment is unstable.

The capacity of the area AR is one.

With this configuration, collision and a deadlock between the robots MB are securely suppressed.

The server 1 includes the graph structure generation unit 12. The graph structure generation unit 12 specifies a range in which the task complexity tolerance does not satisfy the tolerance standard. The graph structure generation unit 12 sets the plurality of graph elements GE present within the specified range as the area AR.

With this configuration, conflict of the robots MB across the plurality of graph elements GE is suppressed.

The route planning unit 14 avoids conflict in the area AR by adjusting the order of carrying out the plurality of tasks TK accumulated in the task queue TO.

With this configuration, the task TK is safely executed without greatly deteriorating efficiency.

The route planning unit 14 avoids conflict in the area AR by adjusting moving speed of one or more robots MB traveling to the area AR.

With this configuration, the task TK is safely executed without greatly deteriorating efficiency.

The route planning unit 14 processes adjustment of the moving speed as adjustment of moving cost.

With this configuration, a route search can be performed without significantly changing a publicly-known algorithm.

The route planning unit 14 avoids conflict in the area AR by adjusting period for carrying out the task TK.

With this configuration, the task TK is safely executed without greatly deteriorating efficiency.

The server 1 includes the task planning unit 13. The task planning unit 13 preferentially allocates, to the robot MB having a relay function for the radio wave WV, the task TK at a position where the radio wave WV can be relayed to the area AR.

With this configuration, the robot MB present in the area AR can be controlled using the relayed radio wave WV.

Note that the effects described in this specification are only exemplification and are not limited. Other effects may be present.

Supplementary Note

Note that the present technology can also adopt the following configurations.

(1)

An information processing apparatus comprising:

a map generation unit that calculates allowable complexity of a task as task complexity tolerance and generates a task complexity tolerance map indicating a distribution of the task complexity tolerance; and

17 a route planning unit that performs route planning for a mobile body to satisfy a constraint based on the task complexity tolerance map.

(2)

The information processing apparatus according to (1), wherein the map generation unit calculates the task complexity tolerance at each time and each point based on a monitoring result of a communication state.

(3)

The information processing apparatus according to (2), wherein the route planning unit performs the route planning such that conflict of mobile bodies exceeding a capacity of the area does not occur in an area determined based on the task complexity tolerance map.

(4)

The information processing apparatus according to (3), wherein the capacity of the area is one.

(5)

The information processing apparatus according to (3) or (4), further comprising a graph structure generation unit that specifies a range in which the task complexity tolerance does not satisfy a tolerance standard and sets a plurality of graph elements present within the range as the area.

(6)

The information processing apparatus according to any one of (3) to (5), wherein the route planning unit avoids the conflict in the area by adjusting order of carrying out a plurality of tasks accumulated in a task queue.

(7)

The information processing apparatus according to any one of (3) to (5), wherein the route planning unit avoids the conflict in the area by adjusting moving speed of one or more mobile bodies traveling to the area.

(8) The information processing apparatus according to (7), wherein the route planning unit processes adjustment of the moving speed as adjustment of moving cost.

(9)

The information processing apparatus according to any one of (3) to (5), wherein the route planning unit avoids the conflict in the area by adjusting period for carrying out the task.

(10)

The information processing apparatus according to any one of (3) to (9), further comprising a task planning unit that preferentially allocates, to a mobile body having a relay function for the radio wave, the task at a position where a radio wave can be relayed to the area.

(11)

An information processing method executed by a computer, the information processing method comprising:

calculating allowable complexity of a task as task complexity tolerance;

generating a task complexity tolerance map indicating a distribution of the task complexity tolerance; and performing route planning for a mobile body to satisfy a constraint based on the task complexity tolerance map.

(12)

A program for causing a computer to implement:

calculating allowable complexity of a task as task complexity tolerance;

generating a task complexity tolerance map indicating a distribution of the task complexity tolerance; and performing route planning for a mobile body to satisfy a constraint based on the task complexity tolerance map.

REFERENCE SIGNS LIST

1 SERVER (INFORMATION PROCESSING APPARATUS)
12 GRAPH STRUCTURE GENERATION UNIT
13 TASK PLANNING UNIT
14 ROUTE PLANNING UNIT
15 MAP GENERATION UNIT
1000 COMPUTER
AR AREA
DM2 TASK COMPLEXITY TOLERANCE MAP
GE GRAPH ELEMENT
MB ROBOT (MOBILE BODY)
TK TASK
TQ TASK QUEUE
WV RADIO WAVE

The invention claimed is:

1. An information processing apparatus comprising:
processing circuitry configured to
acquire a monitoring result of a communication state of each of a plurality of mobile bodies;
calculate allowable complexity of a conveyance task as task complexity tolerance at times and points of an operation space based on the monitoring result, the task complexity tolerance being a numerical value;
generate a task complexity tolerance map indicating a distribution of the task complexity tolerance, the task complexity tolerance map including a first level indicating a tolerance at which the plurality of mobile bodies are permitted to cooperate for the conveyance task, a second level indicating a tolerance at which the plurality of mobile bodies are prohibited from cooperating and permitted to pass each other, and a third level indicating a tolerance at which only one mobile body is permitted to be present in an area of the operation space and the plurality of mobile bodies are prohibited from passing each other;
perform route planning for the plurality of mobile bodies to satisfy the first level, the second level, and the third level as a constraint based on the task complexity tolerance map;
generate planned routes for the plurality of mobile bodies based on the route planning; and
control the plurality of mobile bodies to travel along the planned routes while satisfying the constraint.

2. The information processing apparatus according to claim 1, wherein the processing circuitry is further configured to perform the route planning such that, in an area determined based on the task complexity tolerance map, conflict of the plurality of mobile bodies exceeding a capacity of the area does not occur.

3. The information processing apparatus according to claim 2, wherein the capacity of the area is one.

4. The information processing apparatus according to claim 2, wherein the processing circuitry is further configured to:
specify a range in which the task complexity tolerance does not satisfy a tolerance standards; and
a set a plurality of graph elements, including nodes and edges, present within the range as the area.

5. The information processing apparatus according to claim 2, wherein the processing circuitry is further configured to avoid the conflict in the area by adjusting an order of carrying out a plurality of conveyance tasks accumulated in a task queue.

6. The information processing apparatus according to claim 2, wherein the processing circuitry is further configured to avoid the conflict in the area by adjusting a moving speed of one or more of the plurality of mobile bodies traveling to the area.

7. The information processing apparatus according to claim 6, wherein the processing circuitry is further configured to process adjustment of the moving speed as adjustment of a moving cost.

8. The information processing apparatus according to claim 2, wherein the processing circuitry is further configured to avoid the conflict in the area by adjusting a period for carrying out the conveyance task.

9. The information processing apparatus according to claim 2, wherein the processing circuitry is further configured to allocate, to a mobile body of the plurality of mobile bodies having a relay function for a radio wave, the conveyance task at a position where the radio wave can be relayed to the area.

10. An information processing method executed by a computer, the information processing method comprising:
    acquiring a monitoring result of a communication state of each of a plurality of mobile bodies;
    calculating allowable complexity of a conveyance task as task complexity tolerance at times and points of an operation space based on the monitoring result, the task complexity tolerance being a numerical value;
generating a task complexity tolerance map indicating a distribution of the task complexity tolerance, the task complexity tolerance map including a first level indicating a tolerance at which the plurality of mobile bodies are permitted to cooperate for the conveyance task, a second level indicating a tolerance at which the plurality of mobile bodies are prohibited from cooperating and permitted to pass each other, and a third level indicating a tolerance at which only one mobile body is permitted to be present in an area of the operation space and the plurality of mobile bodies are prohibited from passing each other;
    performing route planning for the plurality of mobile bodies to satisfy the first level, the second level, and the third level as a constraint based on the task complexity tolerance map;
    generating planned routes for the plurality of mobile bodies based on the route planning; and
    controlling the plurality of mobile bodies to travel along the planned routes while satisfying the constraint.

11. A non-transitory computer readable medium storing a program which when executed causes a computer to perform a method, the method comprising:
    acquiring a monitoring result of a communication state of each of a plurality of mobile bodies;
calculating allowable complexity of a conveyance task as task complexity tolerance at times and points of an operation space based on the monitoring result, the task complexity tolerance being a numerical value;
    generating a task complexity tolerance map indicating a distribution of the task complexity tolerance, the task complexity tolerance map including a first level indicating a tolerance at which the plurality of mobile bodies are permitted to cooperate for the conveyance task, a second level indicating a tolerance at which the plurality of mobile bodies are prohibited from cooperating and permitted to pass each other, and a third level indicating a tolerance at which only one mobile body is permitted to be present in an area of the operation space and the plurality of mobile bodies are prohibited from passing each other;
    performing route planning for the plurality of mobile bodies to satisfy the first level, the second level, and the third level as a constraint based on the task complexity tolerance map;
    generating planned routes for the plurality of mobile bodies based on the route planning; and
    controlling the plurality of mobile bodies to travel along the planned routes while satisfying the constraint.

12. The information processing apparatus according to claim 1, wherein the monitoring result of the communication state includes at least one of a noise floor or a number of times of communication retransmissions.

13. The information processing apparatus according to claim 1, wherein the processing circuitry is further configured to calculate the task complexity tolerance using a hyperbolic tangent function applied to a radio wave intensity and a number of communication errors.

14. The information processing apparatus according to claim 1, wherein the cooperation for the conveyance task permitted at the first level includes a transfer of a conveyance object between the plurality of mobile bodies.

15. The information processing apparatus according to claim 1, wherein the processing circuitry is further configured to perform the route planning using a Conflict-Based Search (CBS) algorithm to determine a set of routes for the plurality of mobile bodies without conflict.

16. The information processing apparatus according to claim 1, wherein the processing circuitry is further configured to decompose the conveyance task into a movement task, a loading task, and an unloading task.

17. The information processing apparatus according to claim 1, wherein the processing circuitry is further configured to determine a temporary stop position for one of the plurality of mobile bodies before the one of the plurality of mobile bodies enters the area of the operation space where the task complexity tolerance is at the third level.

18. The information processing apparatus according to claim 1, wherein the processing circuitry is further configured to, upon a new moving destination being added for one of the plurality of mobile bodies, perform a review of existing route plans for other mobile bodies of the plurality of mobile bodies currently in operation to satisfy the constraint.

19. The information processing apparatus according to claim 1, wherein the processing circuitry is further configured to calculate the task complexity tolerance based on an estimated command frequency per second that can be transmitted to the plurality of mobile bodies, and
    the third level corresponds to an estimated command frequency of less than one per second.

20. The information processing apparatus according to claim 19, wherein the first level corresponds to an estimated command frequency of 50 or larger per second.

* * * * *